(12) United States Patent
Varma et al.

(10) Patent No.: US 11,120,414 B1
(45) Date of Patent: Sep. 14, 2021

(54) SYSTEMS AND METHODS FOR FACILITATING TRANSACTIONS BETWEEN PAYERS AND MERCHANTS

(71) Applicant: Square, Inc., San Francisco, CA (US)

(72) Inventors: Ajit Varma, San Francisco, CA (US); Jack Dorsey, San Francisco, CA (US); Jesse Reiss, San Francisco, CA (US)

(73) Assignee: SQUARE, INC., San Francisco, CA (US)

( * ) Notice: Subject to any disclaimer, the term of this patent is extended or adjusted under 35 U.S.C. 154(b) by 0 days.

(21) Appl. No.: 15/886,228

(22) Filed: Feb. 1, 2018

Related U.S. Application Data

(63) Continuation of application No. 13/951,410, filed on Jul. 25, 2013, now abandoned.

(60) Provisional application No. 61/733,394, filed on Dec. 4, 2012.

(51) Int. Cl.
*G06Q 40/00* (2012.01)
*G06Q 20/12* (2012.01)

(52) U.S. Cl.
CPC .................... *G06Q 20/12* (2013.01)

(58) Field of Classification Search
CPC .... G06Q 30/0207; G06Q 30/02; G06Q 20/40; G06Q 20/3224; G06Q 20/387; G06Q 30/0226; G06Q 30/06; G06Q 20/12; G06Q 20/227; G06Q 30/0238
See application file for complete search history.

(56) References Cited

U.S. PATENT DOCUMENTS

| | | | |
|---|---|---|---|
| 2,666,655 | A | 1/1954 | Wolowitz |
| 2,811,796 | A | 11/1957 | Schoelles |
| 3,606,138 | A | 9/1971 | Allison |
| D271,985 | S | 12/1983 | Belser |
| 5,467,917 | A | 11/1995 | Potter |
| 5,629,977 | A | 5/1997 | Fonseca |

(Continued)

FOREIGN PATENT DOCUMENTS

| WO | 2012/051072 A1 | 4/2012 |
|---|---|---|
| WO | 2014/108916 A1 | 7/2014 |

OTHER PUBLICATIONS

Final Office Action dated Apr. 12, 2019, for U.S. Appl. No. 14/282,215, of Poursartip, A., filed May 20, 2014.

(Continued)

*Primary Examiner* — Mike Anderson
(74) *Attorney, Agent, or Firm* — Polsinelli PC

(57) ABSTRACT

A computer-implemented method for facilitating a transaction between a payer and a merchant comprises identifying one or more merchants that are at or in proximity to a geolocation of the payer, and providing the payer a reward, notification or a reminder of a stored value associated with a merchant to apply to a transaction with the merchant. The reward, notification or reminder of the stored value can be provided based on an inference of intent of the payer to conduct a transaction with the merchant. A request to conduct a transaction with the merchant is received from the payer. The transaction between the payer and the merchant is processed with the reward or stored value applied thereto. A notification can be sent to the payer alerting the payer to a discounted item or proximity of the payer to an item and/or merchant they have saved to a list.

17 Claims, 7 Drawing Sheets

(56) References Cited

U.S. PATENT DOCUMENTS

| | | | |
|---|---|---|---|
| D396,055 S | 7/1998 | Ritchey | |
| D504,159 S | 4/2005 | Best et al. | |
| D512,456 S | 12/2005 | Diaz et al. | |
| D531,187 S | 10/2006 | Gusmorino et al. | |
| 7,222,797 B2 | 5/2007 | Davilla et al. | |
| D550,248 S | 9/2007 | Jewitt et al. | |
| D569,902 S | 5/2008 | Chang et al. | |
| D575,332 S | 8/2008 | Parker et al. | |
| D582,931 S | 12/2008 | Blankenship et al. | |
| 7,490,720 B2 | 2/2009 | Cole et al. | |
| 7,523,858 B2 | 4/2009 | Moulton et al. | |
| D593,118 S | 5/2009 | Nathan et al. | |
| 7,529,710 B1 | 5/2009 | Clower et al. | |
| D612,862 S | 3/2010 | Fletcher et al. | |
| D613,300 S | 4/2010 | Chaudhri | |
| D622,763 S | 8/2010 | Lamm et al. | |
| D624,927 S | 10/2010 | Allen et al. | |
| D624,934 S | 10/2010 | Umezawa | |
| 7,908,202 B2 | 3/2011 | Graff | |
| 7,908,262 B2* | 3/2011 | Agranoff | G06Q 30/02 707/706 |
| D638,439 S | 5/2011 | Cavanaugh et al. | |
| D640,284 S | 6/2011 | Woo et al. | |
| 7,975,927 B1 | 7/2011 | Whitney | |
| 8,002,197 B1 | 8/2011 | Whitaker | |
| D645,876 S | 9/2011 | Cavanaugh et al. | |
| 8,027,881 B2 | 9/2011 | Granich | |
| D647,915 S | 11/2011 | Urdan et al. | |
| 8,127,999 B2 | 3/2012 | Diamond | |
| 8,132,668 B2 | 3/2012 | Davis | |
| 8,271,327 B2* | 9/2012 | Walker | G06Q 30/02 705/14.19 |
| D685,842 S | 7/2013 | Glass et al. | |
| 8,484,078 B1 | 7/2013 | Mankoff et al. | |
| 8,538,863 B1 | 9/2013 | Saunders | |
| D695,314 S | 12/2013 | Jang et al. | |
| 8,662,387 B1 | 3/2014 | Geller et al. | |
| D703,230 S | 4/2014 | Abratowski et al. | |
| D704,735 S | 5/2014 | Hollobaugh et al. | |
| 8,719,094 B1 | 5/2014 | Klein et al. | |
| D706,816 S | 6/2014 | Holz et al. | |
| D734,388 S | 7/2015 | Lin et al. | |
| 9,129,273 B2 | 9/2015 | Baldwin et al. | |
| 9,135,612 B1 | 9/2015 | Proctor, Jr. et al. | |
| 9,607,318 B1 | 3/2017 | Gerchikov et al. | |
| 9,805,366 B1 | 10/2017 | Wilson et al. | |
| 10,013,136 B2 | 7/2018 | Bachman et al. | |
| 10,217,130 B1 | 2/2019 | Varma et al. | |
| 10,229,412 B1 | 3/2019 | Henderson | |
| 10,984,414 B1 | 4/2021 | Wilson et al. | |
| 2002/0023059 A1 | 2/2002 | Bari et al. | |
| 2002/0046116 A1* | 4/2002 | Hohle | G06Q 20/10 705/14.27 |
| 2002/0062281 A1 | 5/2002 | Singhal | |
| 2002/0100797 A1 | 8/2002 | Hollingsworth et al. | |
| 2002/0120582 A1 | 8/2002 | Elston et al. | |
| 2002/0184500 A1 | 12/2002 | Maritzen et al. | |
| 2003/0126094 A1 | 7/2003 | Fisher et al. | |
| 2003/0154406 A1 | 8/2003 | Honarvar et al. | |
| 2003/0187784 A1 | 10/2003 | Maritzen et al. | |
| 2003/0206169 A1 | 11/2003 | Springer et al. | |
| 2004/0049420 A1 | 3/2004 | Carlson et al. | |
| 2004/0140361 A1 | 7/2004 | Paul et al. | |
| 2004/0230610 A1 | 11/2004 | Gutierrez-Sheris | |
| 2004/0249753 A1 | 12/2004 | Blinn et al. | |
| 2005/0249389 A1 | 11/2005 | Knowles | |
| 2005/0283436 A1 | 12/2005 | Greer et al. | |
| 2006/0085513 A1 | 4/2006 | Malik | |
| 2006/0089909 A1 | 4/2006 | McLeod et al. | |
| 2006/0168150 A1 | 7/2006 | Naik et al. | |
| 2007/0017973 A1 | 1/2007 | Blank et al. | |
| 2007/0022008 A1 | 1/2007 | Kingsborough et al. | |
| 2007/0080196 A1 | 4/2007 | Rosenkranz et al. | |
| 2007/0084907 A1 | 4/2007 | Kranz | |
| 2007/0299774 A1 | 12/2007 | Eaves | |
| 2008/0103905 A1 | 5/2008 | Nixon-Lane | |
| 2008/0123828 A1 | 5/2008 | Mayer | |
| 2008/0163257 A1 | 7/2008 | Carlson et al. | |
| 2008/0167027 A1 | 7/2008 | Gautier et al. | |
| 2008/0167991 A1* | 7/2008 | Carlson | G06Q 30/0215 705/50 |
| 2008/0177604 A1 | 7/2008 | Shaw et al. | |
| 2008/0262928 A1* | 10/2008 | Michaelis | G06Q 30/02 705/14.26 |
| 2009/0157531 A1 | 6/2009 | Bui | |
| 2009/0165343 A1 | 7/2009 | Miller et al. | |
| 2009/0171836 A1 | 7/2009 | Olliphant et al. | |
| 2009/0171844 A1 | 7/2009 | Olliphant et al. | |
| 2009/0266724 A1 | 10/2009 | Norman | |
| 2009/0313138 A1 | 12/2009 | Ratnakar | |
| 2010/0010918 A1 | 1/2010 | Hunt | |
| 2010/0019030 A1 | 1/2010 | Monk | |
| 2010/0081457 A1 | 4/2010 | Jerome et al. | |
| 2010/0089990 A1 | 4/2010 | Spaulding | |
| 2010/0138344 A1 | 6/2010 | Wong et al. | |
| 2010/0174626 A1 | 7/2010 | Stringfellow et al. | |
| 2010/0276484 A1 | 11/2010 | Banerjee et al. | |
| 2010/0314442 A1 | 12/2010 | Hildred | |
| 2011/0106698 A1* | 5/2011 | Isaacson | G06Q 20/105 705/41 |
| 2011/0125607 A1 | 5/2011 | Wilen | |
| 2011/0155799 A1 | 6/2011 | Meszaros et al. | |
| 2011/0181443 A1 | 7/2011 | Gutierrez et al. | |
| 2011/0238476 A1* | 9/2011 | Carr | G06Q 30/00 705/14.25 |
| 2011/0238517 A1* | 9/2011 | Ramalingam | H04W 4/029 705/26.1 |
| 2011/0291945 A1 | 12/2011 | Ewing, Jr. et al. | |
| 2012/0016731 A1 | 1/2012 | Smith et al. | |
| 2012/0022924 A1 | 1/2012 | Runnels et al. | |
| 2012/0066043 A1 | 3/2012 | Carmichael et al. | |
| 2012/0078783 A1 | 3/2012 | Park | |
| 2012/0095907 A1 | 4/2012 | Dorsey et al. | |
| 2012/0101944 A1 | 4/2012 | Lin et al. | |
| 2012/0109787 A1 | 5/2012 | Larrick et al. | |
| 2012/0118949 A1 | 5/2012 | Diamond | |
| 2012/0136789 A1 | 5/2012 | Kendrick et al. | |
| 2012/0150605 A1 | 6/2012 | Isaacson et al. | |
| 2012/0166334 A1 | 6/2012 | Kimberg et al. | |
| 2012/0171990 A1* | 7/2012 | Williams | H04W 4/24 455/406 |
| 2012/0185317 A1 | 7/2012 | Wong | |
| 2012/0191513 A1 | 7/2012 | Ocher | |
| 2012/0197773 A1 | 8/2012 | Grigg et al. | |
| 2012/0221475 A1 | 8/2012 | Grigg et al. | |
| 2012/0234911 A1 | 9/2012 | Yankovich et al. | |
| 2012/0259842 A1 | 10/2012 | Oman et al. | |
| 2012/0290368 A1 | 11/2012 | Im | |
| 2013/0046635 A1 | 2/2013 | Grigg et al. | |
| 2013/0046686 A1 | 2/2013 | Ress et al. | |
| 2013/0073459 A1 | 3/2013 | Zacarias et al. | |
| 2013/0124855 A1 | 5/2013 | Varadarajan et al. | |
| 2013/0132274 A1 | 5/2013 | Henderson et al. | |
| 2013/0159086 A1* | 6/2013 | Richard | G06Q 30/0207 705/14.33 |
| 2013/0246220 A1 | 9/2013 | Hammad et al. | |
| 2013/0346911 A1 | 12/2013 | Sripada | |
| 2014/0019352 A1 | 1/2014 | Shrivastava | |
| 2014/0058873 A1 | 2/2014 | Sorensen et al. | |
| 2014/0074581 A1 | 3/2014 | Johnson et al. | |
| 2014/0157186 A1 | 6/2014 | Bhat et al. | |
| 2014/0183265 A1 | 7/2014 | Barnings et al. | |
| 2014/0195419 A1 | 7/2014 | Sim et al. | |
| 2014/0203088 A1 | 7/2014 | Eng | |
| 2014/0222596 A1 | 8/2014 | S | |
| 2015/0269560 A1 | 9/2015 | Barrett | |
| 2015/0310419 A1 | 10/2015 | Kadaster et al. | |
| 2015/0310477 A1 | 10/2015 | Mankoff | |
| 2015/0356563 A1 | 12/2015 | Vohra et al. | |
| 2016/0012465 A1 | 1/2016 | Sharp | |
| 2017/0200198 A1 | 7/2017 | Grucci et al. | |
| 2018/0114213 A1 | 4/2018 | Kranzley et al. | |

(56) References Cited

U.S. PATENT DOCUMENTS

| | | | |
|---|---|---|---|
| 2019/0197540 A1 | 6/2019 | Henderson |
| 2019/0355047 A1 | 11/2019 | Scipioni |
| 2020/0258084 A1 | 8/2020 | Henderson |

OTHER PUBLICATIONS

Advisory Action dated Jun. 21, 2019, for U.S. Appl. No. 14/282,215, of Poursartip, A., filed May 20, 2014.
Goode, L., "Paying With Square's New Mobile-Payments App," All Things D, dated Apr. 30, 2012, Retrieved from the Internet URL: http://allthingsd.com/20120430/paying-with-squares-new-mobile-payments-app/, on Nov. 7, 2014, pp. 1-3.
Mohamed, N. and Al-Jaroodi, J., "Temporal Web Alerts," 2010 Seventh International Conference on Information Technology: New Generations, published on Apr. 1, 2010, pp. 637-641.
Non-Final Office Action dated Jun. 27, 2014, for Design U.S. Appl. No. 29/437,478, of Lin, A., et al., filed Nov. 16, 2012.
Non-Final Office Action dated Aug. 18, 2014, for Design U.S. Appl. No. 29/437,474, of Andersen, R., at al., filed Nov. 16, 2012.
Non-Final Office Action dated Aug. 18, 2014, for Design U.S. Appl. No. 29/437,475, of Andersen, R., filed Nov. 16, 2012.
Non-Final Office Action dated Sep. 12, 2014, for U.S. Appl. No. 13/951,410, of Varma, A., et al., filed Jul. 25, 2013.
Non-Final Office Action dated Nov. 20, 2014, for U.S. Appl. No. 13/943,617, of Henderson, W., filed Jul. 16, 2013.
Final Office Action dated Dec. 11, 2014, for Design U.S. Appl. No. 29/437,474, of Andersen, R., et al., filed Nov. 16, 2012.
Notice of Allowance dated Mar. 13, 2015, for Design U.S. Appl. No. 29/437,478, of Lin, A., et al., filed Nov. 16, 2012.
Final Office Action dated Apr. 6, 2015, for U.S. Appl. No. 13/951,410, of Varma, A., et al., filed Jul. 25, 2013.
Non-Final Office Action dated May 13, 2015, for U.S. Appl. No. 14/027,706, of Wilson, M., et al., filed Sep. 16, 2013.
Final Office Action dated Sep. 9, 2015, for U.S. Appl. No. 14/027,706, of Wilson, M., et al., filed Sep. 16, 2013.
Non-Final Office Action dated Oct. 9, 2015, for U.S. Appl. No. 13/951,410, of Varma, A., et al., filed Jul. 25, 2013.
Non-Final Office Action dated Feb. 11, 2016, for U.S. Appl. No. 14/092,724, of Varma, A., et al., filed Nov. 27, 2013.
Final Office Action dated Apr. 28, 2016, for U.S. Appl. No. 13/951,410, of Varma, A., et al., filed Jul. 25, 2013.
Non-Final Office Action dated May 5, 2016, for U.S. Appl. No. 14/027,706, of Wilson, M., et al., filed Sep. 16, 2013.
Final Office Action dated Sep. 8, 2016, for U.S. Appl. No. 14/027,706, of Wilson, M., et al., filed Sep. 16, 2013.
Final Office Action dated Sep. 23, 2016, for U.S. Appl. No. 14/092,724, of Varma, A., et al., filed Nov. 27, 2013.
Non-Final Office Action dated Nov. 18, 2016, for U.S. Appl. No. 14/282,215, of Poursartip, A., filed May 20, 2014.
Advisory Action dated Dec. 20, 2016, for U.S. Appl. No. 14/027,706, of Wilson, M., et al., filed Sep. 16, 2013.
Advisory Action dated Jan. 13, 2017, for U.S. Appl. No. 14/092,724, of Varma, A., et al., filed Nov. 27, 2013.
Non-Final Office Action dated Feb. 9, 2017, for U.S. Appl. No. 14/027,706, of Wilson, M., et al., filed Sep. 16, 2013.
Non-Final Office Action dated Mar. 23, 2017, for U.S. Appl. No. 13/951,410, of Varma, A., et al., filed Jul. 25, 2013.
Final Office Action dated Mar. 28, 2017, for U.S. Appl. No. 14/282,215, of Poursartip, A., filed May 20, 2014.
Notice of Allowance dated Jun. 28, 2017, for U.S. Appl. No. 14/027,706, of Wilson, M., et al., filed Sep. 16, 2013.
Non-Final Office Action dated Jun. 28, 2017, for U.S. Appl. No. 14/092,724, of Varma, A., et al., filed Nov. 27, 2013.
Non-Final Office Action dated Jul. 28, 2017, for U.S. Appl. No. 14/282,215, of Poursartip, A., filed May 20, 2014.
Final Office Action dated Oct. 16, 2017, for U.S. Appl. No. 13/951,410, of Varma, A., et al., filed Jul. 25, 2013.
Final Office Action dated Dec. 12, 2017, for U.S. Appl. No. 14/092,724, of Varma, A., et al., filed Nov. 27, 2013.
Final Office Action dated Feb. 27, 2018, for U.S. Appl. No. 14/282,215, of Poursartip, A., filed May 20, 2014.
Advisory Action dated Mar. 8, 2018, for U.S. Appl. No. 14/092,724, of Varma, A., et al., filed Nov. 27, 2013.
Non-Final Office Action dated May 3, 2018, for U.S. Appl. No. 14/918,814, of Henderson, W., filed Oct. 21, 2015.
Advisory Action dated Jun. 11, 2018, for U.S. Appl. No. 14/092,724, of Varma, A., et al., filed Nov. 27, 2013.
Notice of Allowance dated Oct. 10, 2018, for U.S. Appl. No. 14/092,724, of Varma, A., et al., filed Nov. 27, 2013.
Notice of Allowance dated Oct. 26, 2018, for U.S. Appl. No. 14/918,814, of Henderson, W., filed Oct. 21, 2015.
Non-Final Office Action dated Dec. 4, 2018, for U.S. Appl. No. 14/282,215, of Poursartip, A., filed May 20, 2014.
Non-Final Office Action dated Sep. 16, 2019, for U.S. Appl. No. 16/291,980, of Henderson, W., filed Mar. 4, 2019.
Non-Final Office Action dated Nov. 8, 2019, for U.S. Appl. No. 15/797,939, of Wilson, M., et al., filed Oct. 30, 2017.
Final Office Action dated Jul. 21, 2020, for U.S. Appl. No. 16/251,381, of Varma, A., et al., filed Jan. 18, 2019.
Non-Final Office Action dated Jan. 29, 2020, for U.S. Appl. No. 16/251,381, of Varma, A. et al., filed Jan. 18, 2019.
Non-Final Office Action dated Jan. 30, 2020, for U.S. Appl. No. 16/291,980, of Henderson, W., filed Mar. 4, 2019.
Final Office Action dated Mar. 18, 2020, for U.S. Appl. No. 15/797,939, of Wilson, M., et al., filed Oct. 30, 2017.
Pre-Interview First Office Action dated Aug. 26, 2020, for U.S. Appl. No. 16/983,534, of Henderson, W., et al., filed Aug. 3, 2020.
Advisory Action dated Sep. 28, 2020, for U.S. Appl. No. 16/251,381, of Varma, A. et al., filed Jan. 18, 2019.
First Action Interview Office Action dated Sep. 29, 2020, for U.S. Appl. No. 16/983,534, of Henderson, W., et al., filed Aug. 3, 2020.
Final Office Action dated Oct. 19, 2020, for U.S. Appl. No. 16/864,915, of Henderson, W., filed May 1, 2020.
Non-Final Office Action dated Nov. 24, 2020, for U.S. Appl. No. 16/251,381, of Varma, A. et al., filed Jan. 18, 2019.
Notice of Allowance dated Dec. 9, 2020, for U.S. Appl. No. 15/797,939, of Wilson, M., et al., filed Oct. 30, 2017.
Notice of Allowance dated Jun. 22, 2020, for U.S. Appl. No. 16/291,980, of Henderson, W., filed Mar. 4, 2019.
Non-Final Office Action dated Jun. 30, 2020, for U.S. Appl. No. 16/864,915, of Henderson, W., filed May 1, 2020.
Non-Final Office Action dated Jan. 15, 2021, for U.S. Appl. No. 16/864,915, of Henderson, W., filed May 1, 2020.
Non-Final Office Action dated Dec. 23, 2020, for U.S. Appl. No. 16/983,534, of Henderson, W., et al., filed Aug. 3, 2020.
Final Office Action dated Apr. 5, 2021, for U.S. Appl. No. 16/983,534, of Henderson, W., et al., filed Aug. 3, 2020.
Final Office Action dated Apr. 6, 2021, for U.S. Appl. No. 16/251,381, of Varma, A. et al., filed Jan. 18, 2019.
Advisory Action dated Jul. 12, 2021, for U.S. Appl. No. 16/251,381, of Varma, A. et al., filed Jan. 18, 2019.

* cited by examiner

SYSTEMS AND METHODS FOR FACILITATING TRANSACTIONS BETWEEN PAYERS AND MERCHANTS

CROSS-REFERENCE TO RELATED APPLICATIONS

This application is a continuation of U.S. patent application Ser. No. 13/951,410, filed Jul. 25, 2013, which claims the benefit of U.S. Provisional Application No. 61/733,394, filed Dec. 4, 2012; both of which are incorporated herein by reference in their entireties.

BACKGROUND

Consumers routinely make purchases using plastic credit or debit cards. Such plastic cards typically have magnetic stripes or chips that are encoded with information, such as a consumer's account information. A credit or a debit card may be used in a business transaction with a bank or creditor through use of a device that communicates with the bank or creditor, such as, for example an automated teller machine (ATM) or a credit card reader.

Credit cards having standard specifications can typically be read by point-of-sale devices at the location of a merchant. When the card is coupled to an electronic card reader at the merchant, such as a platform card reader, the electronic card reader may use its built-in communications interface to contact a creditor that handles credit authentication requests to process the transaction. The transaction may be finalized upon verification of the consumer's account information and the receipt of an approval signal from the creditor.

SUMMARY

This disclosure provides systems and methods for facilitating transactions between payers and merchants. Payers in some cases can be incentivized to conduct a transaction with a merchant. In some examples, a payer can be provided a reward or a reminder of a stored value associated with the merchant to apply to a transaction with the merchant based on an inference of intent of the payer to conduct a transaction with the merchant. The intent can be inferred based on various payer-specific factors, including a transaction history of the payer.

An aspect of the disclosure provides a computer-implemented method for facilitating a transaction between a payer and a merchant, comprising determining a current context of the payer based on a current time or location data from a device of the payer, and providing the payer with a reminder of a stored value associated with the merchant. The reminder is provided based on the current context of the payer. Next, request for a transaction between the payer and the merchant is received by a computer system programmed to facilitate the transaction. With the aid of a computer processor of the computer system, the transaction between the payer and the merchant is processed. The stored value is applied to the transaction.

Another aspect of the disclosure provides a computer-implemented method for facilitating a transaction between a payer and a merchant among one or more merchants, comprising identifying the one or more merchants that are at or in proximity to a geolocation of the payer, and providing the payer with a reward or a reminder of a stored value associated with the merchant to apply to a transaction with the merchant. The reward or the reminder is provided based on an inference of intent of the payer to conduct a transaction with the merchant or purchase goods or services provided by the merchant, which inference of intent is calculated with the aid of a computer processor. Next, a request from the payer to conduct a transaction with the merchant is received. The request is received by a computer system programmed to facilitate the transaction. With the aid of a computer processor of the computer system, the transaction between the payer and the merchant is processed. The reward or the stored value is applied to the transaction or maintained for use in a future transaction.

Another aspect of the disclosure provides a computer-implemented method for providing a reward to a payer in connection with a transaction between the payer and a merchant, comprising processing, with the aid of a computer processor of a computer system programmed to facilitate a transaction between a payer and a merchant, the transaction between the payer and the merchant. The transaction is initiated upon receiving, by the computer system, a request from the payer to conduct a transaction with the merchant. The request can be received upon the computer system providing the payer a reward or a reminder of a stored value associated with the merchant to apply to the transaction or a future transaction. The reward or reminder of the stored value can be provided to the payer based on an inference of intent of the payer to conduct a transaction with the merchant.

Another aspect of the disclosure provides a computer-implemented method for facilitating a transaction between a payer and a merchant, comprising providing the payer a reward or a reminder of a stored value associated with the merchant to apply to a transaction with the merchant. The reward or reminder of the stored value is provided based on a determination, with the aid of a computer processor of a computer system, of the likelihood of the payer to conduct a transaction with the merchant among one or merchants at or in proximity to a geolocation of the payer. The transaction between the payer and the merchant is processed with the aid of the computer system subsequent to the payer being provided the reward or the reminder of the stored value.

Another aspect of the disclosure provides a system for facilitating a transaction between a payer and a merchant, comprising one or more computer processors, and a memory location coupled to the one or more computer processors. The memory location comprises machine-executable code which, when executed by at least a subset of the one or more computer processors, implements any of the methods described above or elsewhere herein.

Another aspect of the disclosure provides a computer-readable medium comprising code which, when executed by one or more computer processors, implements any of the methods described above or elsewhere herein.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF DRAWINGS

The novel features of the claimed invention are set forth with particularity in the appended claims. A better understanding of the features and advantages of the present invention will be obtained by reference to the following detailed description that sets forth illustrative embodiments, in which the principles of the invention are utilized, and the accompanying drawings or figures (also "FIG." or "FIGs." herein) of which:

DETAILED DESCRIPTION

Figure 1:
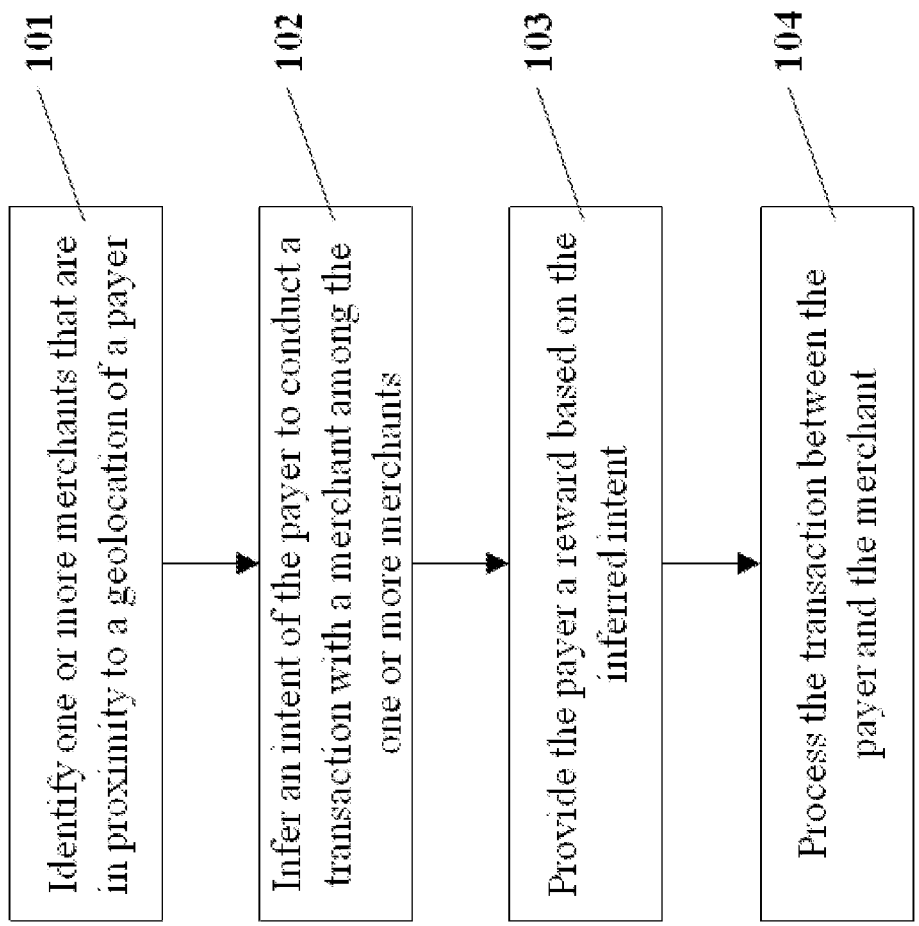
FIG. 1 schematically illustrates a transaction workflow, in accordance with an embodiment of the invention.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

The term "merchant," as used herein, generally refers to an individual, business or other entity, the occupation of which is the sale of goods or services for profit or, alternatively, trade of an item of value for another item of value. In an example, a merchant is a retail business or a shopkeeper. A merchant can be a provider of good, services, or both goods and services. A merchant may be an online business or entity offering a product or service for profit of trade. Examples of merchants include, without limitation, food stores, grocery stores, electronic stores, department stores, bars, clubs, restaurants and book stores.

The term "user," as used herein, generally refers to an individual or entity that uses systems and methods of the disclosure. A user can be an individual or entity that wishes to purchase a product or service of a merchant. A user can be a payer. A user that is a payer can potentially conduct a transaction with a merchant, but need not necessarily conduct a transaction with the merchant. In some situations, a user can be a merchant.

The term "stored value," as used herein, generally refers to an item of value to a payer. Examples of stored values include gift cards, prepaid balances, or balances from previous transactions, such as merchant credit (e.g., store credit).

The term "widget," as used herein, is an element in an application or web page that includes dynamic content. Widgets can take the form of on-screen device (clocks, event countdowns, auction-tickers, stock market tickers, flight arrival information, daily weather etc.).

The term "geographic location" (also "geo-location" and "geolocation" herein), as used herein, generally refers to the geographic location of an object, such as a user. A geolocation of a user can be determined or approximated using a geolocation device or system associated with the user, which may be an electronic device (e.g., mobile device) attached to or in proximity to the user. Geolocation information can include the geographic location of the object, such as coordinates of the object and/or an algorithm or methodology to approximate or otherwise calculate (or measure) the location of the object, and, in some cases, information as to other objects in proximity to the object. In some examples, geolocation information of a user includes the user's geographic location and/or the location of one or more merchants in proximity to the user. Geolocation information can include the relative positioning between objects, such as between users, or a payer and a merchant. In some cases, the geolocation of an object (e.g., user, electronic device) is not necessarily the location of the object, but rather the location that the object enters an area or structure, such as a building.

A geolocation device may be a portable electronic device (e.g., APPLE IPHONE, ANDROID-enabled device). In some cases, the geolocation of an object can be determined using the manner in which a mobile device associated with the object communicates with a communication node, such as a wireless node. In an example, the geolocation of an object can be determined using node triangulation, such as, e.g., wireless node, WiFi node, satellite triangulation, and/or cellular tower node triangulation. In another example, the geolocation of a user can be determined by assessing the proximity of the user to a WiFi hotspot or one or more wireless routers. In some cases, the geolocation of an object can be determined using a geolocation device that includes a global positioning system ("GPS"), such a GPS subsystem (or module) associated with a mobile device (e.g., GPS capabilities of an APPLE IPHONE or ANDROID based system).

In some situations, the geolocation of an object can be determined with the aid of visual and/or audio information captured by an electronic device of a user, such as, for example, images and/or video captured by a camera of the electronic device, or a peripheral device (e.g., GOOGLE Glasses) coupled to the electronic device.

Methods for Inferring Intent

An aspect of the disclosure provides methods for inferring payer intent to conduct a transaction with one or more merchants or one or more groups of merchants. Such methods can be implemented with the aid of a computer system ("system") programmed or otherwise configured to infer intent, as described elsewhere herein. The user can be a payer, such as a payer engaging or seeking to engage in a product or service transaction with a merchant. Inferred intent can be used to recommend or otherwise suggest one or more merchants to a payer, and/or make product or service recommendations to the payer. For instance, if a system of the disclosure determines a likely (e.g., more likely than not) intent of a payer, then the system can recommend a product or service to the payer with a reasonable expectation that the payer will select the product or service.

In some examples, the system determines whether the payer intends to or is likely to conduct a transaction with a merchant, and the system provides the payer with a reminder or prompt displaying a reward (e.g., discount, promotion, or deal) or a stored value (e.g., a gift card or a prepaid balance)

that can be applied to the transaction with the merchant. The system can provide the reward as an offer for a free product or service, or a product or service discount. The reward or stored value can be applied to a present transaction with a merchant, or applied to a future transaction with a merchant.

The reward or stored value can be provided to incentivize the payer to visit the merchant and conduct the transaction with the merchant, thereby increasing the likelihood that the payer conducts the transaction with the merchant. The reward can be one or more free products and/or services, one or more product and/or service discounts, or other incentive (e.g., gift) to the payer to conduct a transaction with the merchant.

Payer intent can be directed to a present intent to make a purchase. As an alternative, payer intent can be directed to a future intent to make a purchase. In some situations, payer intent can be directed to the inclination or propensity of the payer to select a product or service among a plurality of products presented to the payer. Payer intent can be directed to the inclination or propensity of the payer to select a merchant among a plurality of merchants. For example, a payer may not have a present intent to visit a coffee shop, but the system, from the payer's previous coffee shop purchases, may infer that the payer will wish to purchase from a given coffee shop among a plurality of coffee shops in a geographic area.

Payer intent can be directed to a merchant with whom the payer may wish to conduct a transaction or a product (or service) that the payer may wish to purchase. Alternatively, payer intent can be directed to a merchant or product that is deemed (e.g., by systems of the disclosure) to be most likely selected by the payer, such as from multiple merchants and/or products or services. As another alternative, payer intent can be directed to a merchant or product (or service) that is deemed to be selected by the payer within a given degree of likelihood when presented to the payer, such as selected by the payer at a degree of likelihood of at least about 5%, 10%, 20%, 30%, 40%, 50%, 60%, 70%, 80%, 90%, 95%, or 99%. In an example, the system can determine that a payer is at least 51% or 60% likely to select a given merchant from a plurality of merchants at or in proximity to the payer.

In some examples, a reward or reminder of stored value associated with a merchant is provided to the payer if the system determines that the payer is at least about 5%, 10%, 20%, 30%, 40%, 50%, 60%, 70%, 80%, 90%, 95%, or 99% likely to conduct a transaction with a given merchant. The reward can be directed for use with the given merchant. In other examples, a reward is provided to the payer if the system determines that the payer is at least about 5%, 10%, 20%, 30%, 40%, 50%, 60%, 70%, 80%, 90%, 95%, or 99% likely to purchase a product or service from the merchant.

Payer intent to conduct a transaction with a merchant can be calculated or otherwise determined from various factors, such as the payer's habits, user preferences, and payer contextual data (collectively "payer data" herein). The payer's habits and preferences can be inferred from sources, such as a travel history of the payer, a work history of the payer, an educational history of the payer, a health history of the payer, a consumption history of the payer, a transactional (e.g., spending) history of the payer, and social engagement(s) history of the payer (collectively, "payer history" herein). Payer intent can also be derived by collections that the payer stores within the system. For instance the payer may collect a list of their favorite restaurants or a list of items they are interested in purchasing, which can be similar to a grocery list. The list can be prepared ahead of time, or the payer can create the lists while the payer is at a location (e.g., store) of the merchant, such as by, for example, scanning bar codes in order to remember the product for future purchase and receive reminders, such as when the product is discounted. Payer intent can be inferred from payer history, which can be retained by the system in a computer database. For example, the system can maintain a database with a transactional history of the payer, which can include a history of transactions between the payer and one or more merchants.

In some examples, a payer can create a product list. A product list can include items the payer knows that the payer may want or one or more items that the payer selects from a merchant, such as when the payer visits the merchant. The system can then identify when the payer should be informed that a particular item from the payer's list is in proximity to the payer. In an example, the payer has a soap on a product list of the payer and the system determines if a particular merchant sells the soap. The system can perform a search using, for example, natural language processing to determine whether the merchant sells the soap, in addition to determining other items that the merchant sells which may be of desired or of interest to the payer.

Payer contextual data can be based on, for example, time data (e.g., time of day, day of week, etc.), calendar data (e.g., data reflecting past and future time and location for events) or payer device data (e.g., location of the device) that reflects a payer's context at a given point in time. A combination of payer context data and/or payer history data and/or payer list data can be used to surface relevant recommendations, or prompts for reward or stored value. In an example, the system determines that a payer (e.g., customer) has stored value with a nearby merchant and that the payer is near that merchant. The system can provide a reminder to the payer that he/she has stored value with the merchant. For example, the payer can have a gift card with a coffee shop. The system can remind the payer of the gift card when the payer is nearby the coffee shop. In another example, the system can detect deviations from patterns in the payer history, determine that the context for the payer has changed, and provide recommendations as appropriate. By way of example, the system uses payer history to determine that the payer usually buys coffee and bagel in the morning. The system can determine based on location data that the payer is not at home, but on a business trip, and suggest merchants nearby that sell coffee and bagel. The system can also detect when the payer is near an item or merchant the payer has saved to the payer's list, or near items similar to items on the payer's list. By way of example, the system knows that the payer has saved a bottle of aspirin to the payer's list and the system alerts the payer when the payer is in proximity to a merchant that has a discounted bottle of aspirin.

The payer history can be gleaned or otherwise collected (or aggregated) from various sources, such as, for example, network sources, including, without limitations, Internet and intranet sources. The system can be configured to search various network sources (e.g., web sites) and retrieve and save information that may qualify as information included in the payer history. In some examples, the system can aggregate information of or related to payer history from various network sources, including social networking web sites (e.g., FACEBOOK, FOURSQUARE, GOOGLE+, LINKEDIN, TUMBLR, INSTAGRAM, PINTEREST) or on publisher sites, such as, for example, weblogs (e.g., FACEBOOK, TUMBLR).

In some examples, the system includes a web crawler that constantly, routinely or periodically collects payer history information and stores this information in a database of the system. The payer history information can then be used to predict an intent or likelihood of the payer to conduct a transaction with a merchant.

Payer intent to conduct a transaction with a merchant can be calculated by using payer data (e.g., such as payer history, payer contextual data and lists of items curated by the payer) and predicting a likelihood of the payer to conduct the transaction with the merchant. The prediction can use various mathematical models to calculate a likelihood of the transaction. The prediction can make use of multivariate statistics to identify classes of similar subjects in a sample population to build a model that provides or approximates a predictive spending pattern of a payer. Techniques that can be employed include, but are not limited to, Collaborative Filtering, Machine learning, Natural Language Processing, Discriminant Function Analysis (DFA), Hierarchical Clustering Analysis, Factor Analysis (in which an underlying model or relationship is assumed), Self-Organizing Maps (SOMs), Support Vector Machines (SVMs), and Neural Nets. Each can be a pattern recognition technology using multivariate descriptor vectors, which subjects are classmates, to more completely manage an adaptive clinical trial.

In some cases, a predictive spending model of a payer can be used to assess a likelihood (or intent) of the payer to conduct a transaction with a merchant among a plurality of merchants. Based on the likelihood, the system can provide (or offer) the payer a reward to apply to the transaction or a future transaction. The reward can be intended to increase the likelihood that the payer will conduct a transaction with the merchant.

For example, if the system determines that the payer is 50% likely to conduct a transaction with a first coffee shop and 80% likely to conduct a transaction with a second coffee shop, the system can offer the payer a reward or remind the payer of a stored value that can be applied in a transaction with the second coffee shop (e.g., "Hi Jack, you have $5 unused credit at the Coffee Spot"). Alternatively, the system can offer the payer a reward to apply to a transaction with the first coffee shop if the system determines that the payer, with the reward, is more likely to conduct a transaction with the first coffee shop than the second coffee shop with or without the reward.

Inference of intent can be determined from a predictive spending model. The model can include assessing a trajectory of payer spending with time. For example, the spending habit of the payer can be recorded with time and used to predict which merchant the payer is likely to elect to conduct a transaction at a given point in time. In some cases, the predictive spending model can be used to predict a product or service that the payer will likely purchase.

The predictive model can include sample payer information longitudinally across time for the payer, or sampling payer information longitudinally across multiple payers. The latter scenario can provide group spending information, which can aid in predicting which merchant a group of payers is likely to select among multiple merchants.

In some situations, payer intent can be inferred by determining a current context of the payer. The current context of the payer can be determined based on a current time and/or location (e.g., geolocation) of the payer, which time and/or location can be determined using a device (e.g., geolocation device) of the payer. In some examples, payer intent is calculated by correlating, using a computer processor, time data (e.g., timestamp) and/or location data of the payer with time information and/or location information associated with known contexts of the payer and/or others users. In some cases, the correlation is made with the of a context table having context categories (e.g., work, baseball game, social event) as a function of time and/or location. The context table can be populated through user input, such as input by the payer and other payers.

Methods for Facilitating Transactions Between Payers and Merchants

In an aspect of the disclosure, a computer-implemented method for facilitating a transaction between a payer and a merchant comprises identifying one or more merchants that are at or in proximity to a geolocation of the payer, and providing the payer a reward or a reminder of stored value that can be applied to a transaction with the merchant. The reward or reminder of stored value can be provided for application to a transaction between the payer and a merchant among the one or more merchants, or applied to a transaction with another merchant. The reward or reminder of stored value can be provided based on an inference of intent of the payer to conduct a transaction with the merchant. For example, the award can be provided based on a likelihood (e.g., at least 60%) that the payer will want to conduct a transaction with the merchant.

In some cases, a current context of the payer can be determined based on a current time and/or location data (e.g., geolocation data) from a device of the payer. A reward, discount, alert or reminder of stored value can be provided based on the current context of the payer.

Next, a request from the payer enter into a transaction with the merchant is received. The request can be received by a computer system programmed to facilitate the transaction, as described elsewhere herein. The transaction between the payer and the merchant is the processed with the aid of a processor of the computer system. The reward or stored value is applied to the transaction or maintained for use in a future transaction.

For instance, the reward or stored value can be applied to the present transaction between the payer and the merchant. That is, the reward or stored value can be applied to the transaction that the payer has requested to conduct with the merchant. As an alternative, the reward or stored value can be applied to a future transaction between the payer and the merchant or another merchant. The period in which the award can be applied can be selected by the system or the merchant. For instance, the aware may be redeemable within a period of 1 minute, 1 hour, 2 hours, 3 hours, 4 hours, 5 hours, 6 hours, 12 hours, 1 day, 2 days, 3 days, 4 days, 5 days, 6 days, 1 week, 2 weeks, 3 weeks, 1 month, 12 months, 1 year, or more.

In some cases, the request to conduct the transaction with the merchant can be received from an electronic device of the payer, such as a portable electronic device. The portable electronic device can include a user interface (UI), such as a graphical user interface (GUI), which can enable the payer to initiate the transaction between the payer and the merchant and to view details of the reward, as well as any promotions offered by the merchant to the payer.

The electronic device can be a geolocation device. The geolocation of the payer can be determined with the aid of the geolocation device. In some examples, the request to conduct the transaction with the merchant can be received from the geolocation device.

The inference of intent can be calculated with the aid of one or more processors. The inference of intent is calculated with the aid of a processor of the computer system. In some examples, the inference of intent is calculated by a probabilistic determination that the payer is going to purchase a given product or service, or visit a given merchant. This determination can be made by accessing a database of the computer system or another computer system in communication with the system, and reviewing a transaction history or other behavioral pattern or history of the payer.

In some cases, the inference of intent is calculated based upon payer-specific information maintained in a database of the computer system. The payer-specific information can be selected from one or more of a transaction history of the payer, a travel schedule of the payer, a work schedule of the payer, an eating history of the payer, a spending history of the payer, and social engagement(s) history of the payer.

The request to conduct a transaction with the merchant can be received from an electronic device of the payer. The electronic device can be a portable electronic device, such as a Smart phone (e.g., APPLE IPHONE, ANDROID-enabled telephone), tablet PC (e.g., APPLE IPAD, SAMSUNG GALAXY Tab), or laptop computer (e.g., APPLE MACBOOK PRO, DELL Laptop).

The reward or stored value can be maintained in a database, which can be located on the computer system or other system in communication with the computer system. In some cases, upon the computer system receiving the request from the payer to conduct a transaction with the merchant, the database is accessed to identify the reward or stored value that can be used with the merchant. Alternatively, the computer system accesses database to identify the reward or stored value prior to the payer requesting to conduct a transaction with the merchant. For instance, the rewards database can be accessed to identify the reward if the computer system determines that the payer has an appreciable likelihood (e.g., more likely than not, or a probability of at least 50%, 60%, 70%, 80%, or 90%) of conducting the transaction with the merchant.

A reward or stored value can be selected by the computer system or the merchant to be specific to the payer. For example, the computer system can determine that the payer prefers a first product over a second product and provide a reward directed to the first product (e.g., a discount on the first product).

In some examples, upon the completion of processing of the transaction between the payer and the merchant, the database can be updated. The database can be updated with a record of the transaction and the reward or stored value that was applied to the transaction. In some examples, the computer system displays on an electronic device of the payer the status of the reward based upon the update.

In some situations, the availability of a reward for use is milestone dependent. The computer system can apply the reward to the transaction if the computer system determines that the milestone has been met. The milestone can be, for example, a minimum number of product or service purchases from the merchant, or a spending limit for a given transaction. The reward in such a case can aid the payer to meet a given milestone for the reward.

In some examples, once the one or more merchants in proximity to the payer are identified, a list of the one or more merchants is provided to the payer. The list can be provided on an electronic device of the payer. In some cases, the list is provided on a graphical user interface of the electronic device. The reward can be provided in the list.

The reward can be provided to the payer based on the payer's history with the merchant. For example, a repeat payer (or customer) of a merchant can be provided a discount on select purchases that is different from a first-time customer. Systems of the disclosure can be programmed to maintain a record of rewards, which rewards may be provided to payers. For example a first-time payer of a merchant may be provided a discount on a given purchase. The discount may be provided to incentivize the payer to purchase products or services from the merchant.

FIG. 1 schematically illustrates a method for facilitating a transaction between a payer and a merchant. The method can be implemented by a computer system of the disclosure, such as the server 401 of FIG. 4. In a first operation 101, one or more merchants that are at or in proximity to the payer are identified. Next, in a second operation 102, the computer system makes an inference of intent of the payer to conduct a transaction with each merchant. The inference of intent can involve determining the likelihood that the payer will conduct a transaction with each merchant among the one or more merchants. Next, in a third operation 103, the computer system provides the payer a reward or stored value based on the intent inferred in the second operation 102. The reward can be directed to a merchant among the one or more merchants. The reward or reminder of stored value can be, for example, intended to increase the likelihood that the payer will conduct a transaction with the merchant. Next, in a fourth operation 104, the computer system processes the transaction between the payer and the merchant. The reward or stored value can be applied to the transaction during processing. As an alternative, the reward can be provided by the computer system for use in a future transaction.

Some embodiments provide a computer-implemented method for providing a reward to a payer in connection with a transaction between the payer and a merchant, comprising processing, with the aid of a processor of a computer system programmed to facilitate a transaction between a payer and the merchant, the transaction between the payer and the merchant. The transaction can be initiated upon the computer system receiving a request from the payer to conduct the transaction with the merchant. The request can be received upon the computer system providing the payer a reward to apply to the transaction or a future transaction. The reward can be provided to the payer based on an inference of intent of the payer to conduct a transaction with the merchant. In some cases, the transaction can be processed with a reward applied to the transaction.

The inference of intent can be calculated based upon payer-specific information maintained in a database of the computer system. The payer-specific information can be selected form a payer history. The payer-specific information can include one or more of a travel history of the payer, a work history of the payer, an educational history of the payer, a health history of the payer, a consumption history of the payer, a transactional (e.g., spending) history of the payer, and social engagement(s) history of the payer. The payer-specific information can be used to calculate the likelihood that the payer will conduct a transaction with the merchant.

In some cases, the computer system identifies one or more merchants that are at or in proximity to the geolocation of the payer. The computer system can then access the database in order to identify a reward or stored value that can be used by the payer. The computer system can apply the reward or stored value to the transaction, or make the reward or stored value available for use in a future transaction, if the payer proceeds to conduct the transaction with the merchant.

The status of the reward or stored value (e.g., used, available for use) can be displayed on the electronic device of the payer. The status can be displayed on the UI, such as the GUI, of the electronic device. The status of the reward or stored value can include a time period that is left for the reward or stored value to be redeemed or otherwise applied to a transaction. In some examples, the status can be presented based on the record (or history) of one or more transactions between the payer and the merchant, which can be displayed against a milestone that must be met for the payer to be provided a reward from the merchant. For example, the GUI of the electronic device of the payer can show an electronic punch card, as described elsewhere herein.

The computer system can maintain a record of payer transactions with a given merchant. Rewards can be provided on the basis of the payer's history with the merchant. Alternatively, the system can maintain a record of payer transactions with a given type of merchant. Rewards-based benefits can be provided on the basis of the payer's history with merchants that are included with the given type of merchant. For example, the payer can be provided certain benefits for buying products from coffee stores or specific merchants, such as, e.g., STARBUCKS. Such benefits can be provided by the system.

Some embodiments provide a computer-implemented method for processing a transaction between a payer and a merchant. The method can be implemented using computer systems of the disclosure, such as the server 401 of FIG. 4. The method comprises inferring, with the aid of a computer processor (also "processor" herein) of a computer system, intent of the payer to conduct a transaction with the merchant among one or merchants at or in proximity to a geolocation of the payer. The intent can be used to provide the payer a reward to be applied to a transaction with the merchant or another merchant. In an example, if the computer system determines that the payer is more likely to conduct a transaction with the merchant than other merchants that are at or in proximity to the payer, then the computer system offers the payer a reward to apply to a transaction between the payer and the merchant. The transaction between the payer and the merchant can be processed with the reward applied to the transaction. As an alternative, the reward can be provided to the payer for use in a future transaction and made available to the payer in the future transaction, such as with the merchant or another merchant.

A reward can be provided based on a determination of likelihood of a payer to conduct a transaction with a merchant. A computer-implemented method for facilitating a transaction between a payer and a merchant can comprise providing the payer a reward to apply to a transaction with the merchant or a future transaction with the merchant or another merchant. The reward can be provided based on a determination, with the aid of one or more processors of a computer system, of the likelihood of the payer to conduct a transaction with the merchant among one or merchants at or in proximity to a geolocation of the payer. The transaction between the payer and the merchant can be processed with the aid of the computer system subsequent to the payer being provided the reward.

Rewards can be selected by the system or by the merchant. For example, the merchant can specify one or more items or services that can be used as rewards to provide (e.g., offer) a payer. As an alternative, a merchant can provide the system a reward to offer a payer. The merchant can also select different rewards for different payers. For example, the merchant may wish to provide repeat payers a first reward (e.g., drink discount) and first-time payers a second reward (e.g., free drink). The merchant may also want to target a given payer based on specific items a payer may be interested in. For instance, a reward can be targeted to only payers interested in buying televisions. Rewards can be targeted to only particular item purchases, or groups of items purchased (e.g., product bundles).

Various types of rewards can be provided by a merchant or the system to be used by the payer in the transaction with the merchant. The types of rewards can be dynamically selected in view of merchant preferences or relevance criteria. Relevance criteria can include proximity of the payer to the merchant, whether the payer is a first-time customer or a repeat customer, whether a payer has indicated on a list (e.g., product list) that they are looking for a particular item, and factors related to the payer's history and preferences. A merchant can provide various rewards, such as a free item or service, a discounted item or service, or a percentage reduction of a given transaction. Rewards may be subject to merchant control. The system can provide a reward, which can be based on the merchant's type of business, items and/or services offered for purchase by the merchant, and/or payer-specific information (e.g., items purchased by the payer, the payer's age or sex, etc.).

A reward can be tailored to a merchant (i.e., merchant-specific). A first merchant of a given type (e.g., coffee store) can have a different reward than a second merchant of the given type. In an example, a reward for a first coffee store can be a free cup of coffee, while a reward for a second coffee store can be a discount on a pastry.

Figure 2:
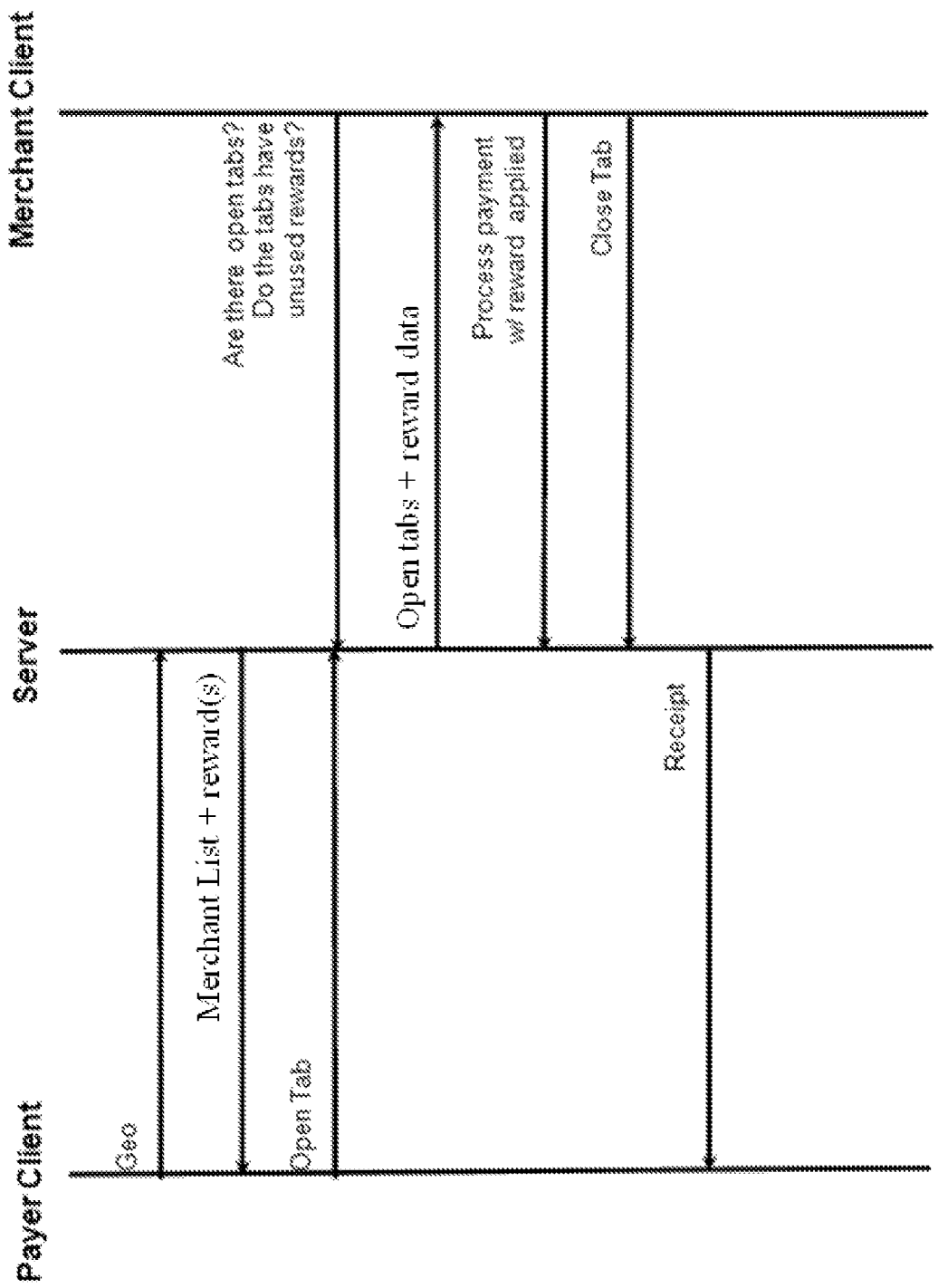
FIG. 2 schematically illustrates a transaction workflow in which a reward or a stored value (e.g., a gift card or prepaid balance) is applied to a given transaction, in accordance with an embodiment of the invention.

FIG. 2 schematically illustrates a method (or workflow) for facilitating a transaction between a payer and a merchant, in accordance with an embodiment of the invention. The method is implemented upon the communication between an electronic device of the payer, a computer server ("Server"), and an electronic device of the merchant. The payer's client ("Payer Client") can be an electronic device, such as a portable electronic device, that is configured to communicate with the Server. The merchant's client ("Merchant Client") can be a computer system that is configured to communicate with the Server. The computer system can include one or more computers, each of which can include one or more processors for executing machine-readable code to implement a transaction.

Initially, the geolocation of the Payer Client is determined, which may be the geolocation of the payer. The geolocation of the payer can be determined using the electronic device of the payer, which can direct geolocation information to the Server. Next, the Server provides the Payer Client a list of merchants based on one or more geolocation criteria of the payer, Server and/or the merchant. The Server may provide the Payer Client a list of merchants that are at or in proximity to the payer's geolocation.

The Server can also provide the payer a reward or a reminder of stored value that the payer can apply to a transaction between a merchant from the list, or to apply to a future transaction with the merchant or another merchant, which may or may not be on the list. The reward can be an offer for a product or service discount, or a free product or service, such as from the merchant. The reward and indication of stored value can be provided based on an inference of intent of the payer to conduct a transaction with a merchant on the list, which intent can be inferred by the Server, as described elsewhere herein.

Next, the payer requests to initiate a transaction with a given merchant from the list of merchants. In some cases, the payer may wish to "open a tab" for the payer with the merchant, allowing the merchant to process a transaction that is charged to the payer's account. Upon the payer indicating in the Payer Client that the payer wishes to open a tab with the merchant, the Payer Client directs the request to open the tab to the Server. The Payer Client can transmit to the Server an indication to open a tab associated with an account of the payer, reflecting an indication of the payer's consent to perform a cardless payment transaction with the merchant. Although the payer has requested to open a tab with the merchant, the payer can request to open a tab with other merchant—i.e., the payer can request to open multiple tabs with multiple merchants.

With reference to FIG. 2, The Merchant Client can send a request to the Server for a list of open tabs (e.g., a list of payer accounts from which the Server has received indication of consent to enter into a cardless payment transaction). The Server can then provide the Merchant Client a list of open tabs along with reward data or data reflected stored value associated with the payer. The Merchant Client can then request to process the transaction with the payer by processing a payment with the payer. The reward or stored value may be applied to the payment. Alternatively, the reward may be provided to the payer for use in a future transaction with the merchant (e.g., a free or discounted coffee in a future transaction with the merchant).

The transaction can be processed by the Server. The Merchant Client can provide the Server an indication to close the tab associated with the transaction. The indication can be provided prior to the Server completing the processing of the transaction, concurrently with the processing, or after the processing. The Server can then transmit an electronic receipt to the payer, which can include any rewards information, status of stored value, and/or loyalty updates (e.g., electronic punch card updates). The workflow of FIG. 2 can be suited for cardless payment transactions.

In some cases, upon the Merchant Client requesting a list of open tabs from the Server (e.g., a list of payers from which the Server has received indication of consent to enter into a payment transaction for the merchant), the Merchant Client can request information relating to whether any of the tabs have unused rewards or stored value. The unused rewards may have been provided to the payer from a previous transaction, such as a previous transaction with the merchant or another merchant. The unused rewards may have been provided to the payer based on an inference of intent for the payer to conduct a transaction with a merchant.

Next, the Server can determine whether the open tab account associated with the payer has any unused rewards or stored value with the merchant. As an alternative, such determination can be made at the Merchant Client. For instance, the Server can include a rewards database that includes payer transactional data and a rewards history. The Server can update the payer's rewards history based on one or more rewards criteria supplied by the merchant, which criteria can include a free or discounted product or service upon a given number of purchases at the merchant (e.g., the payer shall receive one free drink upon purchasing ten drinks), or the proximity of the payer to the merchant. In some cases, upon the payer requesting to open a tab with the merchant to purchase a product or service provided by the merchant, the Server or the merchant can determine whether the payer is eligible to use a reward in the transaction. If the payer is eligible to use a reward, the merchant can process payment with the reward applied and provides transaction information (e.g., payment and reward applied) to the Server for further processing. The Merchant Client can then provide instructions to the Server to close the tab associated with the payer. The Server can then direct or otherwise provide an electronic receipt to the Payer Client.

In some embodiments, a merchant can determine whether a payer has a valid reward or stored value prior to applying any reward or stored value to a transaction. In some cases, the Merchant Client directs a unique identification code or number, or other identifier that is uniquely associated with the payer, to the Server. The Server then determines whether the payer has a valid reward or stored value and transmits to the Merchant Client an indication that the payer's reward is valid or invalid, or, in some cases, provides the Merchant Client a valid reward associated with the payer. The Merchant Client can process payment with reward or stored value applied to the transaction, and subsequently transmit the transaction information to the Server.

Figure 4:
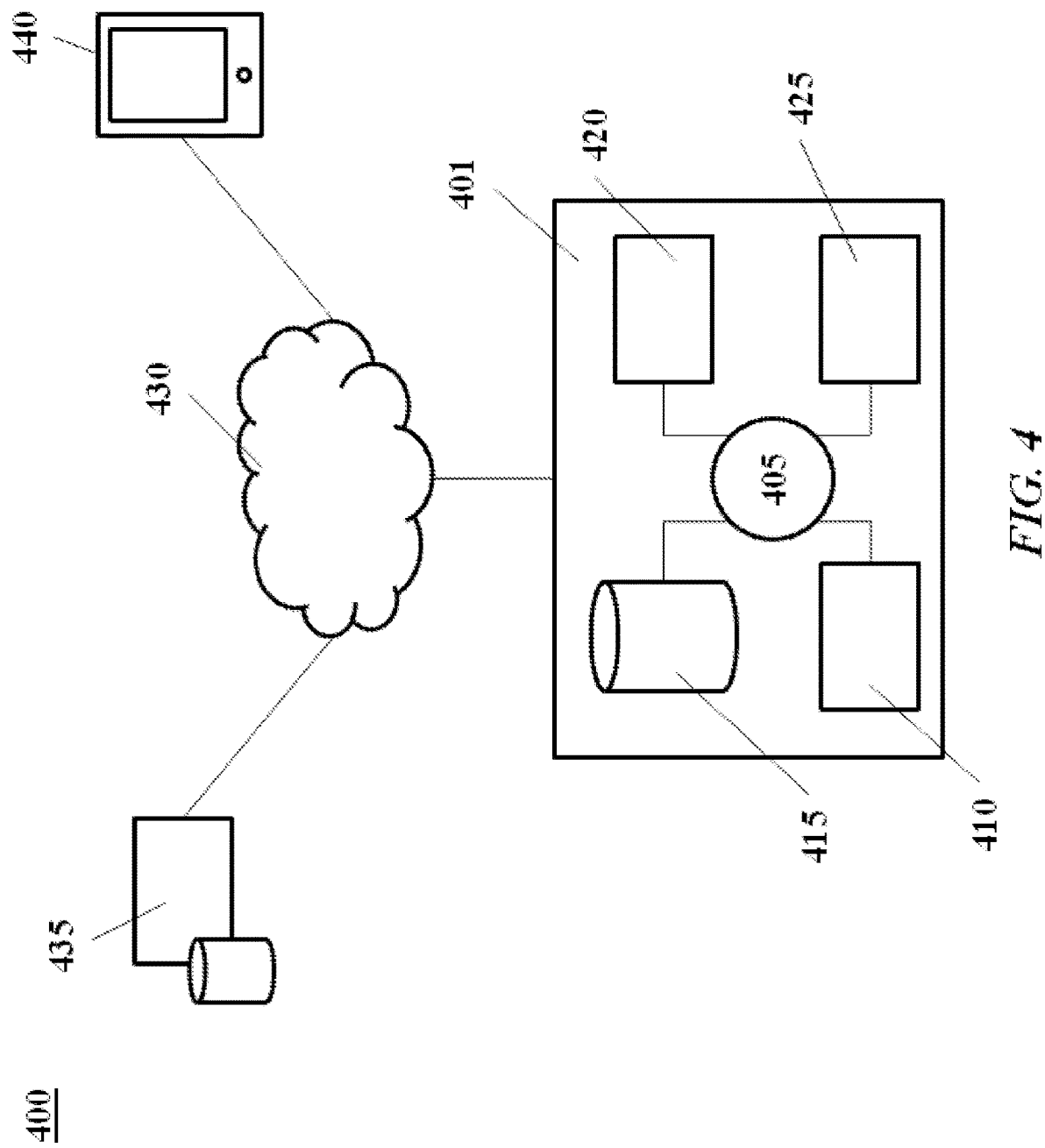
FIG. 4 schematically illustrates a system for facilitating methods of the disclosure.

The workflow of FIG. 2 can be implemented in cash or card transactions, or cardless transactions. Cardless transactions can include transactions facilitated with the aid of systems provided herein, such as the system 400 of FIG. 4. In an example, in a cardless scenario a server facilitating a transaction between a payer and merchant, such as the server 401 of FIG. 4, provides funds to the merchant and receive funds from the payer.

In some examples, the Merchant Client can request reward or stored value information from the Server, and the Server can provide that information to the Merchant Client. The Merchant Client can then determine whether the payer has rewards or stored value to be applied to the transaction.

In some cases, the payer and merchant can maintain a record of transactions. Such record can be maintained in a database of the Server or a system in communication with the Server. The record can be used to determine whether rewards or stored values can be applied to a given transaction. In some examples, upon the Merchant Client processing a payment with the Server for a given transaction with the Payer Client of the payer, a rewards record or record of stored value of the payer is updated to reflect the transaction. The rewards record can be spending based, visit based, etc. In some cases, the rewards record is an electronic punch card, and upon the Server processing payment, the rewards record is updated by including an additional electronic punch in the punch card. The record can be updated by the Merchant Client, which can subsequently direct an indication of the updated rewards card to the Server, or, alternatively, the rewards record can be updated by the Server.

A reward or stored value can be selected by a merchant. For example, a merchant can select a product or service to offer a payer upon the payer meeting a milestone, such as a number of product purchases. The milestone can be selected by the merchant.

A rewards record or stored value record can be created, updated or otherwise maintained in a database of the Server, such as for example, the storage unit 415 of the server 401 of FIG. 4. Alternatively, the database can be located on the Merchant Client, or a system associated with the Merchant Client. In an example, a stored value record can include one or more columns indicating an initial stored value, values applied/used in transactions, and a current balance. In an example, a rewards record can include a database column that includes a requisite limit (or milestone) that a payer must meet in order for the payer to be provided a reward. The rewards record can also include a database column that includes a reward number that is incremented upon successive purchases. Upon request from the Merchant Client, the Server can compare the reward number to the limit to determine whether a reward may be provided to the payer. In some cases, a rewards record is updated only if one or more rewards criteria (e.g., minimum spending amount) are met. The one or more rewards criteria may be selected by the merchant.

A rewards record can be an electronic punch card, which punch card can keep a record of the number of transactions conducted that meet one or more rewards criteria, and a requisite milestone that must be met in order for the payer to be given a reward.

In some cases, upon the Server processing a transaction between a merchant and a payer, the Server provides the Payer Client an electronic receipt of the transaction and an update on any rewards or stored value the payer may have with the merchant. The electronic receipt can be provided to the payer via an electronic message, such as instant message, short-message service (SMS) text message, multimedia message service (MMS) text message, or electronic mail ("email"), or a message or other notification that is specific to the application implementing the transaction on the Payer Client (e.g., a device application, or "app"). In some cases, GUI of an electronic device of the payer can be updated with information to reflect the transaction. In some situations, a merchant card on a GUI of the payer (or user) is updated to reflect the transaction, to provide a reward status (e.g., product or service discount), or both.

The Server can facilitate payment from the payer to the merchant. In an example, the system transfers funds to the merchant and receives funds from the payer. The funds received from the payer may be greater than or equal to the funds transferred to the merchant. In another example, the system transfers funds directly from the payer to the merchant.

Merchant Directories and Merchants Cards

This disclosure provides merchant cards, which can be displayed on a user interface, such as a graphical user interface (GUI), on an electronic device of a payer. Merchant cards can be displayed in a directory. The directory can be provided on a GUI of an electronic device of the payer. The device can be coupled to a system having a computer processor that is programmed or otherwise configured to execute machine-executable code to search for and provide merchants to the electronic device of the payer, as described elsewhere herein.

A merchant card can be dedicated to a given merchant. In an example, a first merchant card is dedicated to a first merchant and a second merchant card is dedicated to a second merchant that is different from the first merchant. The first merchant card can have information that is only relevant to the first merchant and the second merchant card can have information that is only relevant to the second merchant. There can be a one-to-one correspondence between a merchant card and a merchant, though in some cases a merchant card can be dedicated to a plurality of merchants, such as a group of merchants.

A merchant card can permit a payer to initiate and conduct an electronic transaction with a merchant associated with the merchant card. The electronic transaction can be conducted over a network, such as the Internet or an intranet. In some examples, a merchant card permits a payer to open a tab with a merchant. The merchant card can permit a payer to initiate a transaction with a merchant.

The directory can be continually updated based on the location of the payer, which may be changing. The directory can be updated to provide merchant cards associated with merchants that are within a given distance from the payer (e.g., within 1, 2, 3, 4, or 5 miles from the payer), closest to the payer (e.g., within 1 mile from the payer), deemed most relevant to the payer, or closest to the payer and most relevant. In some examples, a merchant card in the directory is associated with a merchant that is within a distance that is selected by the merchant. The merchant in such a case may wish to conduct a transaction with the payer if the payer is within a distance from the merchant that is selected by the merchant. In some cases, the system can present the payer with merchant cards of merchants that may not be the closest to the payer, but may be more relevant to the payer than merchants that may be closer to the payer. In some cases, the directory is updated every 1 second or less, 2 seconds or less, 3 seconds or less, 4 seconds or less, 5 seconds or less, 6 seconds or less, 7 seconds or less, 8 seconds or less, 9 seconds or less, 10 seconds or less, 30 seconds or less, 1 minute or less, 2 minutes or less, 3 minutes or less, 4 minutes or less, 5 minutes or less, 10 minutes or less. Alternatively, the directory can be updated manually, such as upon request by the payer. The directory can be updated in response to an event, such as, e.g., request by the payer, request by a merchant, a new promotion, or a changed location of the payer.

Geographic information of the payer, such as geographic location of the payer, can be determined prior to providing the directory. The content of the directory can be based on a geographic location of the payer. In some cases, the one or more merchant cards are sorted based on the proximity of each merchant associated with each of the one or more merchant cards to the geographic location of the payer. The one or more merchant cards can be sorted based on a calculated likelihood that the payer will conduct a transaction with a given merchant in the directory. For example, the merchant cards can be sorted in order of decreasing likelihood that the payer will conduct a transaction with a given merchant. In some cases, the one or more merchant cards can be sorted based on proximity of the payer to a given merchant and likelihood that the payer will conduct a transaction with the given merchant in the directory.

The geographic information of the payer can be determined with the aid of a geolocation device of the payer, which may be a portable electronic device. The geolocation device of the payer can be used to initiate and conduct a transaction with the merchant. The geolocation device can have a graphical user interface (GUI) that enables the payer to initiate the transaction with a merchant and process the transaction.

The directory can be sorted based on the relevance of each merchant associated with each of the one or merchant cards to the payer. The relevance of each merchant to the payer can be determined based on one or more relevance criteria, such as, for example, the inference of intent that the payer will conduct a transaction with each merchant. In some examples, the directory is sorted based on the likelihood that the payer will conduct a transaction with each merchant. In an example, the system determines that the payer is more likely to conduct a transaction with a first merchant than a second merchant, and displays a merchant card of the first merchant above a merchant card of the second merchant.

Merchant cards can be sorted based on one or more relevance criteria, including inferred intent to conduct a transaction with a merchant, the number of transactions between the payer and a merchant, number of transactions between the payer and a type of merchant, number of transactions between the payer and all merchants, traffic conditions to the one or more merchants, deals or promotions provided by the one or more merchants, the degree (or level) of interest for a particular merchant (e.g., The Coffee Spot) or particular type of merchant (e.g., a coffee shop, Indian food) from the payer's transaction history, type of transaction involved, items involved in a transaction, types of merchants, quality of clicks on the merchant (e.g., click or finger tap on merchant card), content provided by merchant (e.g., quality of images), or other intelligence about payer behavior and/or merchant abilities to fulfill a payer's perceived need(s). In some cases, the one or more relevance criteria include the distance of the payer from a merchant, such as the proximity of the payer to the merchant. In other cases, the one or more relevance criteria do not include the distance of the payer from a merchant. Relevance criteria can also include external data (e.g., weather, news, time of day, week, traffic conditions, etc.). Relevance criteria can include payer predictive behavioral spending, which may be a function of payer spending patterns over time. In some cases, the one or more relevance criteria include the distance of the payer from a merchant, such as the proximity of the payer to the merchant. In other cases, the one or more relevance criteria do not include the distance of the payer from a merchant.

The directory can be filtered. In some examples, the directory is filtered based on one or more criteria selected by the payer. Such criteria can include location, distance of a merchant associated with a merchant card from the payer, type of merchant (e.g., restaurant, grocery store), type of items offered by a merchant (e.g., coffee), hot or trendy items, hot or trendy merchants, new items and merchants.

In some embodiments, merchant cards in the directory are ranked or otherwise sorted in view of the payer's preferences, such as the payer's merchant preferences (e.g., restaurant preferences), interests, item preferences, list of items and/or merchants the payer has created and/or other factors that may be relevant. For example, if the system determines that the payer visits coffee shops on a given day of the week or a given time of the day, the payer can rank coffee merchants higher in the directory than merchants that do not provide coffee.

Merchant card ranking can be based on one or more relevance factors, or, in some examples, the combination of one or more relevance factors and the payer's geolocation information, such as the payer's geographic location. Merchant cards can be ranked on the basis of a one or more relevance factors that are weighted in view of the payer's proximity to merchants. In an example, a weighted relevance ranking may be obtained by multiplying a merchant's relevance, as may be determined based on one or more relevance criteria, by a factor that is inversely proportional to the payer's proximity to the merchant. Merchant cards may then be ranked and provided for display by the payer based on the weighted relevance ranking of each merchant card.

A merchant card can be selected to provide additional details on a given merchant, such as product or service details, costs associated with products and/or services of the merchant, the location of the merchant, directions to the merchant, hours of operation of the merchant, and promotions offered by the merchant. The payer may select to open a tab with the merchant to initiate a process to purchase a product or service from the merchant.

In some examples, a directory can include 1 or more, 2 or more, 3 or more, 4 or more, 5 or more, 10 or more, 20 or more, 30 or more, 40 or more, 50 or more, 100 or more, or 1000 or more merchant cards.

A subset (e.g., some, nearly all) of the merchant cards can be rendered to be visually different than a remainder of the merchant cards. Such rendering can be dynamic, such as with changing location or time. Such rendering can be dynamic based on relevance to the payer. For example, among a first merchant card and second merchant card, the first merchant card that is directed to a merchant that is more relevant to the payer can have a look that is more pleasing to the payer than the second merchant card. In some examples, the subset of merchant cards can be rendered to have one or more different shapes and/or one or more different colors than the remainder of the merchant cards. As an alternative, or in addition to, the one or more different colors, other visual indicators may be used, such as a background image or shading. The subset of merchant cards can be visually rendered to be different than the remainder based on one or more relevance criteria.

For example, a first merchant card can have a bright orange color and the remainder of merchant cards can have a light gray color. The color can be the background color, a border color, or both. This can permit a payer to readily distinguish the first merchant card from the remainder. As another example, the first merchant card can be rectangular and have a size that is larger than the sizes of the remainder of the merchant cards.

Figure 3:
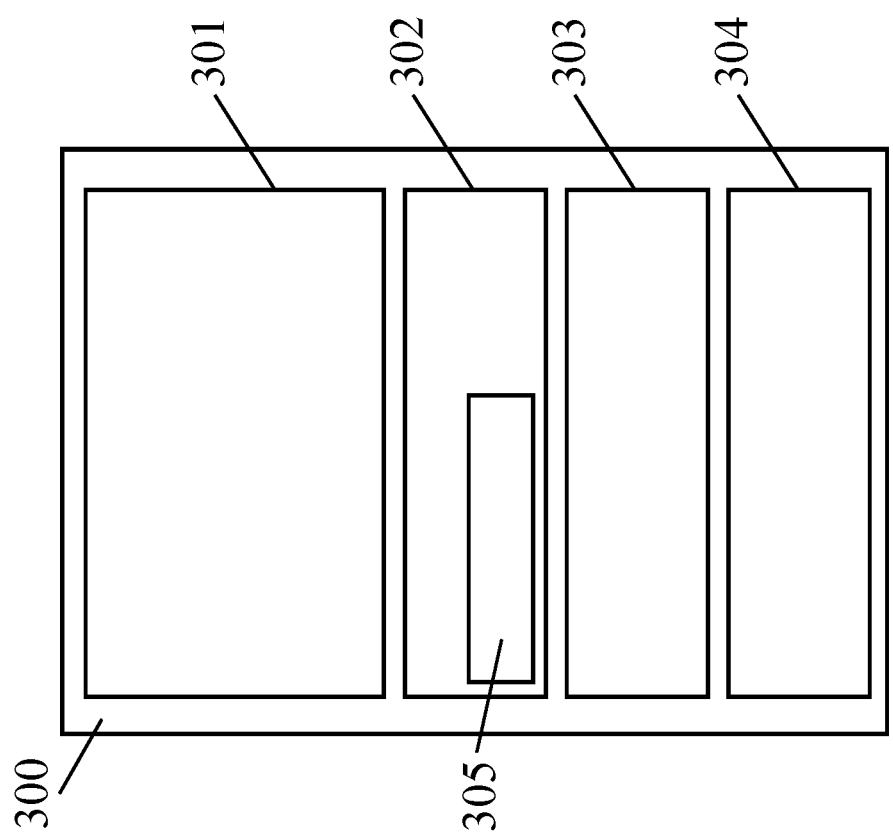
FIG. 3 schematically illustrates a merchant directory with merchant cards, in accordance with an embodiment of the invention.

FIG. 3 shows a merchant directory 300. The directory 300 can be provided on a GUI of an electronic device of the payer. The device may be coupled to a system having a processor that is configured to execute machine-executable code to search for and provide merchants to the electronic device of the payer.

With continued reference to FIG. 3, the directory 300 includes a first merchant card 301, second merchant card 302, third merchant card 303 and fourth merchant card 304. The first card 301 is dedicated to a first merchant, the second card 302 is dedicated to a second merchant, the third card 303 is dedicated to a third merchant, and the fourth card 304 is dedicated to a fourth merchant. Each merchant card may be rendered on the GUI for display on the electronic device of the payer. The first merchant may be a featured merchant. In some cases, the featured merchant is determined by the system or the electronic device of the payer to be most relevant to the payer.

The second merchant card 302 includes a widget 305 with content that is dynamically tailored or otherwise generated to include a reward or information of stored value that can be based on an inference of intent of the payer to conduct a transaction with the second merchant. In some cases, the content of the widget 305 can be dynamically tailored or otherwise generated in view of one or more relevance criteria, as described elsewhere herein. The widget can provide merchant deals, promotions, stored value usable at the merchant or other rewards that are specific to the payer. For example, the widget can provide the payer a discount at a given merchant (e.g., "50% off at The Coffee Spot"), which discount is provided on a predetermined condition (e.g., the basis that the payer is a repeat customer of the merchant).

The payer can select any of the cards 301-304 to view addition detail on each respective merchant. In addition, the payer can select any one of the cards 301-304 to purchase one or more products or services offered by a merchant. Such products may include items of value to the payer, such as food items.

The merchant directory 300 provides various features that may be accessible via payer gestures, as may be facilitated through the GUI on the display of the electronic device of the payer. In some cases, the payer can swipe a hand or finger of the payer or other pointing device (e.g., computer mouse, touch pen) across a surface of the display and adjacent to a card in the directory 300 to access additional features that are specific to the card. For example, the payer can swipe a finger (e.g., from left to right) across the second card 302 to access a bar that enables the payer to open a tab at the second merchant, to select a merchant as a favorite merchant, to forward the merchant card (or a link to the merchant) to a designated recipient, or to contact the merchant. The payer can swipe from left to right (or right to left) on a card (or widget) to reveal content. Each card can reveal different content upon a payer swipe across the card. In some examples, the payer can swipe along a first direction (e.g., top-to-bottom, bottom-to-top, diagonally from bottom to top, diagonally from top to bottom) to browse merchant cards, and swipe along a second direction that may be angled (e.g., orthogonal) to the first direction to view additional information about a given merchant. The payer can swipe diagonally across a given merchant card.

The cards 301-304 can be sorted based on the likelihood that the payer will conduct a transaction with each merchant. In an example, a merchant that the payer frequents may appear at the top of the list, whereas a merchant that the payer has never visited may appear at the bottom of the list.

In some cases, the payer indicates the cards or merchants that the payer prefers over other cards or merchants. For example, the payer can "like" or "dislike" (or, alternatively, not select "like") a given merchant. In some cases, the payer selecting to view a card, or the frequency with which the payer views cards, such as the frequency with which the payer flips through a cards in carousel view, can indicate a preference for a card. The system can learn, based on the payer's merchant or card preferences, which merchants the payer prefers, and provide the payer with merchants that meet the payer's preferences. Such preferences may be determined based on a profile of the payer, such as payer likes and preferences, as may be provided in a profile of the payer.

The look and feel of a merchant card can be tailored based on payer-specific merchant relevance criteria. In some embodiments, a computer-implemented method for providing merchants to a payer comprises providing, on a graphical user interface (GUI) of an electronic device of the payer, a directory of merchant cards, each merchant card having information of or related to a given merchant. Based on one or more payer-specific merchant relevance criteria, a subset of the merchant cards are rendered to be visually different than a remainder of the merchant cards.

In some cases, the shape or color of one card may be selected to make it more or less appealing to a payer than another card. Such modification may be made to increase the likelihood of the payer selecting one card over another. For example, the second card 302 can be provided in a color that is more appealing to the payer (based on the payer's preferences) than the third card 303. Such modification may be made, for example, if the payer is a repeat customer at the second merchant and not the third merchant.

The directory 300 can be viewed in list view (as shown) or carousel view, in which the payer can review additional information about a merchant and peruse other merchants with the aid of gestures. The payer may elect to save certain merchant cards for future use or view. In some examples, the system (or server) receives an indication from a payer selecting certain merchant cards, and in response, the system saves certain merchant cards for later view or use by the payer. In some cases, merchant cards can be ranked and displayed based on distance, or whether merchants have recent offers or other promotional deals or incentives for the payer. If the payer is in close proximity to a merchant to make a payment, the merchant card may provide the payer the opportunity to make a payment (e.g., the card has an "open tab" widget), and may have information that is focused on enabling the payer to make a payment. In some examples, the system, upon determining the proximity of the payer to a merchant, provides the payer information that is focused on enabling the payer to make a payment. If the payer is not in close proximity to the merchant to make a payment, the merchant card can display dynamic information to give the payer a reason or incentive to visit the merchant (e.g., "10% off your purchase").

Systems for Facilitating Transactions

Another aspect of the disclosure provides a system that is programmed or otherwise configured to implement the methods of the disclosure. The system can include a computer server that is operatively coupled to an electronic device of a payer and an electronic device of a merchant.

FIG. 4 shows a system 400 programmed or otherwise configured to enable a payer to search for merchants, in accordance with an embodiment of the invention. The system 400 includes a computer server ("server") 401 that is programmed to implement exemplary methods described herein. The server 401 includes a central processing unit (CPU, also "processor" and "computer processor" herein) 405, which can be a single core or multi core processor, or a plurality of processors for parallel processing. The server 401 also includes memory 410 (e.g., random-access memory, read-only memory, flash memory), electronic storage unit 415 (e.g., hard disk), communications interface 420 (e.g., network adapter) for communicating with one or more other systems, and peripheral devices 425, such as cache, other memory, data storage and/or electronic display adapters. The memory 410, storage unit 415, interface 420 and peripheral devices 425 are in communication with the CPU 405 through a communications bus (solid lines), such as a motherboard. The storage unit 415 can be a data storage unit (or data repository) for storing data. The server 401 is operatively coupled to a computer network ("network") 430 with the aid of the communications interface 420. The network 430 can be the Internet, an internet and/or extranet, or an intranet and/or extranet that is in communication with the Internet. The network 430 in some cases is a telecommunication and/or data network. The network 430 can include one or more computer servers, which can enable distributed computing, such as cloud computing. The network 430 in some cases, with the aid of the server 401, can implement a peer-to-peer network, which may enable devices coupled to the server 401 to behave as a client or a server.

The storage unit 415 can store files, such as filed related to merchant profiles and/or accounts, and payer profiles. The storage unit 415 can store payer data, e.g., payer preferences, payer context data and a payer history, including, without limitation, transactional history of the payer. The server 401 in some cases can include one or more additional data storage units that are external to the server 401, such as located on a remote server that is in communication with the server 401 through an intranet or the Internet.

The storage unit 415 can store payer and merchant transactional information. The storage unit 415 can store payer transactional information, which can include, without limitation, merchants from which the payer has purchased products and/or services, the number of times the payer has used a merchant, the frequency with which the payer purchases products and/or services from a merchant, the types of merchants from which the payer purchases products and/or services. The data storage unit 415 can include payer stored value information (e.g., gift cards, prepaid balances, etc.) and payer reward information, such as rewards from merchants that the payer has accrued from previous transactions with a merchant or multiple merchants.

The server 401 can communicate with one or more remote computer systems through the network 430. In the illustrated example, the server 401 is in communication with a first computer system 435 and a second computer system 440 that are located remotely with respect to the server 401. In the illustrated example, the first computer system 435 is a merchant computer system that may have a database for recording transaction data, and the second computer system 440 is a payer computer system, such as a computer system of a potential purchaser of a service or product of the merchant. The first computer system 435 and second computer system 440 can be, for example, personal computers (e.g., portable PC), slate or tablet PC's (e.g., APPLE IPAD, SAMSUNG GALAXY Tab), telephones, Smart phones (e.g., iPhone APPLE IPHONE, ANDROID-enabled device, BLACKBERRY), or personal digital assistants.

In an example, the second computer system 440 is a portable electronic device of a payer that desires to search for and find merchants at or in proximity to a geolocation of the payer. The second computer system 440 can be configured to provide geographic information of the payer, including the geolocation of the payer. The payer can access the server 401 via the network 430 to request the search. The server 401 can conduct the search and transmit search results to the second computer system 440 of the payer. The search results can be displayed on a graphical user interface of the second computer system 440. In some cases, both the first computer system 435 and the second computer system 440 have a geolocation.

In some situations the system 400 includes a single server 401. In other situations, the system 400 includes multiple servers in communication with one another through an intranet and/or the Internet.

The server 401 can be adapted to store payer profile information, such as, for example, a name, physical address, email address, telephone number, instant messaging (IM) handle, educational information, work information, social likes and/or dislikes, products likes and/or dislikes, merchant preferences, favorites types of merchants (e.g., restaurants preferred over bars) and historical information of past transactions of the payer (which may be transactions made using the system 400), and other information of potential relevance to the payer or other payers. Such profile information can be stored on the storage unit 415 of the server 401.

Methods as described herein can be implemented by way of machine (or computer processor) executable code (or software) stored on an electronic storage location of the server 401, such as, for example, on the memory 410 or electronic storage unit 415. During use, the code can be executed by the processor 405. In some cases, the code can be retrieved from the storage unit 415 and stored on the memory 410 for ready access by the processor 405. In some situations, the electronic storage unit 415 can be precluded, and machine-executable instructions are stored on memory 410. Alternatively, the code can be executed on the second computer system 440 of the payer.

The code can be pre-compiled and configured for use with a machine have a processer adapted to execute the code, or can be compiled during runtime. The code can be supplied in a programming language that can be selected to enable the code to execute in a pre-compiled or as-compiled fashion.

The server 401 can be programmed to infer payer intent to conduct a transaction with a merchant, which can include calculating or otherwise determining the likelihood that the payer will conduct a transaction with the merchant, as described elsewhere herein. The server 401 can use payer history of the payer in such calculation. The server 401 can include various predictive models to enable the server to calculate the likelihood that the payer will conduct a transaction with the merchant.

Aspects of the systems and methods provided herein, such as the server 401, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The server 401 can be configured for data mining, extract, transform and load (ETL), or spidering (including Web Spidering where the system retrieves data from remote systems over a network and access an Application Programmer Interface or parses the resulting markup) operations, which may permit the system to load information from a raw data source (or mined data) into a data warehouse. The data warehouse may be configured for use with a business intelligence system (e.g., MICROSTRATEGY, BUSINESS OBJECTS). The system can include a data mining module adapted to search for media content in various source locations, such as email accounts and various network sources, such as social networking accounts (e.g., FACE-BOOK, FOURSQUARE, GOOGLE+, LINKEDIN) or on publisher sites, such as, for example, weblogs.

The results of a payer-initiated search for merchants can be presented to a payer on a user interface (UI), such as a graphical user interface (GUI), of an electronic device of the payer. A GUI can enable a payer to access the results of a search for merchants at a given geographic. The UI, such as GUI, can be provided on a display of an electronic device of the payer that is adapted to provide geolocation information of the payer, such as, for example, measure (or calculate) the geolocation of the payer. The display can be a capacitive or resistive touch display, or a head-mountable display (e.g., GOOGLE Glasses). Such displays can be used with other systems and methods of the disclosure.

Methods of the disclosure can be facilitated with the aid of applications (apps) that can be installed on electronic devices of a payer. An app can include a GUI on a display of the electronic device of the payer. The app can be programmed or otherwise configured to perform certain functions of the system, such as, for example, permitting a payer to initiate a transaction with a merchant if the payer is within a given distance from the merchant. In an example, if the payer is within a given distance from the merchant, the app can permit the payer to request to initiate a transaction with the merchant, which request is directed to the system. The system can then inform the merchant that the payer desires to initiate a transaction with the merchant, and the transaction can be subsequently processed with the aid of the system, as described elsewhere herein.

Systems of the disclosure may include both payer and merchant data. This can permit a system to determine relevance ranking that may be payer specific and directed at select one or more merchants or types of merchants. The system can be owned and/or operated by a single entity (e.g., company), or multiple entities.

In some cases, the merchant and/or payer information can be stored in a memory location (e.g., hard disk, flash memory) of the system. Accordingly, relevance ranking may be a function of both payer and merchant information. For instance, a merchant may intend to target payers of a given age group. In some cases, a search for merchants by a payer may provide merchants that consider the payer to be relevant to the merchants.

EXAMPLES

Figure 5:
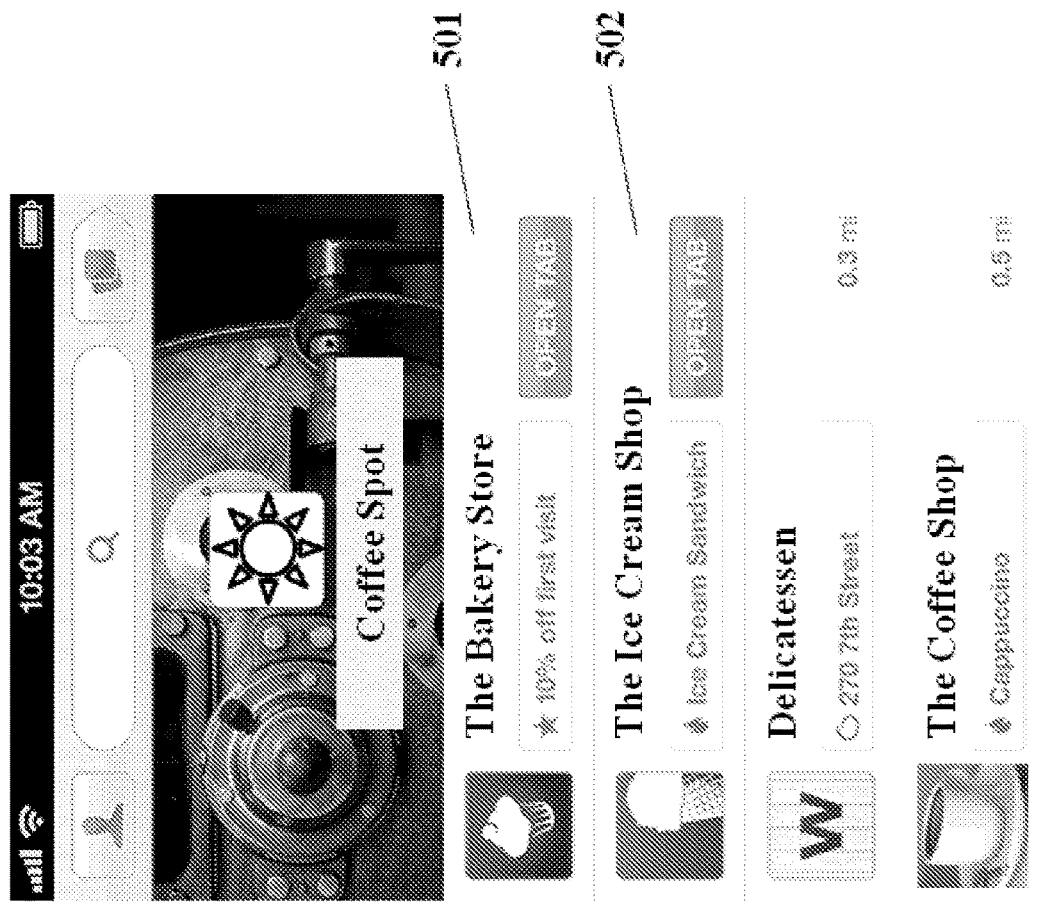
FIGS. 5-7 show screenshots of graphical user interfaces (GUI's) of applications (apps) implemented on an electronic device, in accordance with various embodiments of the invention.
Figure 6:
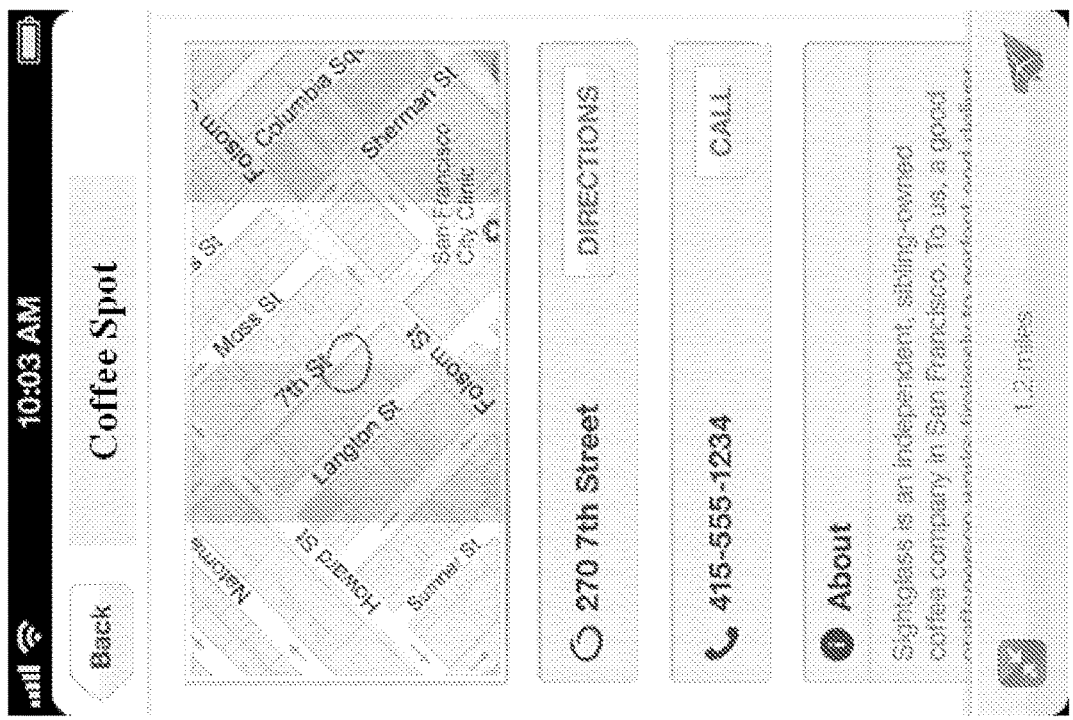
Figure 7:

FIGS. 5-7 show example screenshots of graphical user interfaces (GUI's) of applications (apps) on display on an electronic device (e.g., mobile device) of a user (e.g., payer). The electronic device can include, for example, a passive screen, a capacitive touch screen, or a resistive touch screen. The electronic device can include a network interface and a browser that enables the user to access various sites or locations on an intranet or the Internet. The app is configured to enable the mobile device to communicate with a server, such as the server 401 of FIG. 4, which facilitates a transaction between the user and a merchant.

FIG. 5 shows example results of a search around a geolocation of a payer. The GUI includes, in list view (or "directory view"), a merchant card and a featured merchant ("Coffee Spot"). The merchant cards for The Bakery Store and The Ice Cream Shop include widgets 501 and 502 that include content dynamically tailored to the payer. The content of each widget 501 and 502 includes a discount or other promotion provided by a merchant relevant to the payer. The content of the widgets 501 and 502 can be dynamically tailored based on an inference of intent of the payer to conduct a transaction with The Bakery Store and The Ice Cream Shop. In the illustrated example, The Bakery Store has offered the payer 10% off on the payer's first visit to The Bakery Store.

The merchant cards can be sorted on the basis of relevance criteria, as described elsewhere herein. The cards of FIG. 5 can be ranked on the basis of relevance to the payer, as determined, for example, based on how frequently the payer visits a merchant. In the illustrated example, the system has determined that the payer is a first time payer at The Bakery Store and frequently purchases from The Ice Cream Shop. The system provides The Bakery Store and The Ice Cream Store cards at the top of the list in the illustrated directory. In some cases, relevance can be determined on the basis of a single factor (e.g., the payer is a first-time payer, the payer is a frequent payer), or a balance of multiple factors, such as proximity to a payer and whether the payer is a first time or frequent payer.

In some situations, merchant cards are ranked or otherwise sorted based on what the system or a merchant considers being most relevant to the payer. This can be based on an inference of intent of the payer to conduct a transaction with a merchant. For example, the system may maintain a record of the payer's buying and spending habits, and with the aid of a predictive model predict what the payer may need at a given point in time. Merchant cards may then be sorted based on the predictive model. For example, the system may determine that the payer is likely to want a coffee over a pizza, and provide coffee shop merchant cards towards the top of the list. In another example, the system provides the payer a reward for a coffee purchase and no reward for a pizza purchase.

The payer can select a merchant card for more information on a particular merchant. The payer can access a merchant card to view the location of the merchant. For example, the payer can select the Coffee Spot merchant card to view the location of the Coffee Spot in map view, as shown in FIG. 6. The additional information on the Coffee Spot also includes the address and phone number of the Coffee Spot, and a description of the Coffee Spot (under "About"). The GUI of FIG. 6 displays the distance of the Coffee Spot from the geolocation of the payer (1.2 miles in the illustrated example), or the geolocation of the payer. Under map view, the payer may zoom in for additional features and functionality, such as to view further details of a select area.

The payer can select a merchant card to view a reward or stored value associated with the merchant of the merchant card. FIG. 7 shows details of the reward or stored value associated with the Coffee Spot. In the illustrated example, the payer reward provides the payer "10% OFF A PURCHASE" to be redeemed at a future point in time. The payer can redeem a saved deal (or promotion) by selecting the deal from the GUI. The card also indicates that the payer is a regular (or repeat) customer at the Coffee Spot. From a merchant card, the payer may access one or more products or services offered by a given merchant for purchase using the system.

Rewards and deals may have an expiration date that is set by the system or the merchant. In some cases, a reward may not have an expiration date. A merchant may authorize the system to provide a select number of rewards or deals. In addition, saved rewards can be ranked and sorted based on one or more relevance criteria, which may be dependent on the payer's lifestyle factors, including spending habit. A most recently saved card may appear at the top of a list or other graphical representation (e.g., carousel view) of saved cards.

In some embodiments, saved cards can be ranked or otherwise sorted in view of the payer data, which can include payer history. Payer data can include the payer's eating habits, drinking habits, hobbies, exercise routines, sports activities, sleeping habits, work habits, habits of significant others, and/or other factors that may be relevant to the payer's lifestyle or living condition.

The payer can view cards by swiping a finger of the payer across a display of the electronic device of the payer either from top to bottom or bottom to top, depending on which cards the payer wishes to view. A merchant card can be displayed in list view or carousel view. A merchant card in carousel view may include additional information about the merchant and/or the payer that may not be provided in list view. In some examples, in carousel view the payer can swipe along a first direction (e.g., top-to-bottom, bottom-to-top, diagonally from bottom to top, diagonally from top to bottom) to browse merchant cards, and swipe along a second direction that may be angled (e.g., orthogonal) to the first direction to view additional information about a given merchant. The payer can swipe diagonally across a given merchant card. In some cases, swiping along the second direction can enable the payer to access other features and functionalities, such as accessing another carousel or merchant directory. The reward card of FIG. 7 can be provided on the GUI in carousel view.

It should be understood from the foregoing that, while particular implementations have been illustrated and described, various modifications can be made thereto and are contemplated herein. It is also not intended that the invention be limited by the specific examples provided within the specification. While the invention has been described with reference to the aforementioned specification, the descriptions and illustrations of the preferable embodiments herein are not meant to be construed in a limiting sense. Furthermore, it shall be understood that all aspects of the invention are not limited to the specific depictions, configurations or relative proportions set forth herein which depend upon a variety of conditions and variables. Various modifications in form and detail of the embodiments of the invention will be apparent to a person skilled in the art. It is therefore contemplated that the invention shall also cover any such modifications, variations and equivalents. It is intended that the following claims define the scope of the invention and that methods and structures within the scope of these claims and their equivalents be covered thereby.

What is claimed is:
1. A method comprising:
  determining, by a payment processing system, a geolocation of a portable electronic device associated with a customer, the customer having a corresponding customer account at the payment processing system;
  determining, by the payment processing system, at least one merchant located within a first geo-fence around the portable electronic device to yield a first set of merchants, the first geo-fence covering a first geographical area within a first distance of the geolocation of the portable electronic device, each merchant having a corresponding merchant account at the payment processing system, the payment processing system storing transaction data associated with transactions performed between merchants and buyers, wherein one or more merchant computing devices of one or more of the merchants include a respective instance of a merchant application installed thereon for configuring each of the one or more merchant computing devices as a point-of-sale (POS) terminal to communicate over one or more networks with the payment processing system for at least processing cardless payment transactions, the merchants including the first set of merchants;
  identifying, by the payment processing system, from among status information for the customer that is stored in a storage unit associated with the payment processing system, at least one promotion for acquisitions with at least one merchant of the first set of merchants, the promotion including at least one of a discount, a promotion, a deal or an offer for a free product or service;
  transmitting, by the payment processing system, the at least one promotion to the portable electronic device to yield a set of received promotions;
  determining, by the payment processing system, at least one merchant of the first set of merchants that is located within a second geo-fence around the portable electronic device to yield a second set of merchants, the second geo-fence covering a second geographical area within a second distance of the geolocation of the portable electronic device, the second distance being less than the first distance, the second geographical area being a subset of the first geographical area;
  dynamically updating, by the payment processing system and based on a change in the geolocation of the portable electronic device, the first geo-fence and the second geo-fence to yield an updated first set of merchants and an updated second set of merchants;
  sorting, by the payment processing system, the updated second set of merchants for presentation on a graphical user interface of the portable electronic device based on at least a relevance criteria of the customer for conducting cardless payment transactions to yield a sorted set of merchants;
  permitting, by the payment processing system, the portable electronic device to conduct cardless payment transactions only with the sorted set of merchants in the second geo-fence;
  receiving, by the payment processing and from the portable electronic device, a request to process a cardless payment transaction with an identified merchant from the sorted set of merchants, the request being received via a tab opened on the portable electronic device to initiate a product purchase process for which the cardless payment transaction is to be processed;
  based at least in part on the request, transmitting information to a corresponding POS terminal of the identified merchant indicating consent of the customer to process the cardless transaction payment with the identified merchant; and
  processing, by the payment processing system, the cardless transaction payment between the customer and the identified merchant based at least in part on the request and a corresponding promotion from the set of received promotions that is associated with the identified merchant.

2. The method of claim 1, wherein the sorted set of merchants is further determined based on at least one of a travel history of the customer, a work schedule of the customer, a consumption history of the customer, a spending history of the customer, or social engagement history of the customer.

3. The method of claim 1, wherein the first set of merchants is determined by:
   determining that the customer is interested in acquiring a particular item; and
   determining that each merchant of the first set of merchants offers the particular item for acquisition.

4. The method of claim 1, wherein the sorting is further based on at least one of:
   a visiting frequency with which the customer visits each merchant of the second set of merchants; or
   transaction history of the customer.

5. The method of claim 1, further comprising:
   upon processing the cardless transaction payment, updating a record associated with the customer and the identified merchant to indicate that the corresponding promotion was used in the cardless transaction payment.

6. The method of claim 5, further comprising:
   sending a status of the updated record to the portable electronic device associated with the customer.

7. A payment processing device comprising:
   at least one memory having computer-readable instructions stored therein; and
   one or more processors configured to execute the computer-readable instructions to communicate with a portable electronic device of a customer to:
     determine a geolocation of the portable electronic device associated with the customer, the customer having a corresponding customer account at the payment processing device;
     determine at least one merchant located within a first geo-fence around the portable electronic device to yield a first set of merchants, the first geo-fence covering a first geographical area within a first distance of the geolocation of the portable electronic device, each merchant having a corresponding merchant account at the payment processing device, the payment processing device storing transaction data associated with transactions performed between merchants and buyers, wherein one or more merchant computing devices of one or more of the merchants include a respective instance of a merchant application installed thereon for configuring each of the one or more merchant computing devices as a point-of-sale (POS) terminal to communicate over one or more networks with the payment processing device for at least processing cardless payment transactions, the merchants including the first set of merchants;
     identify, from among status information for the customer that is stored in a storage unit associated with the payment processing device, at least one promotion for acquisitions with at least one merchant of the first set of merchants, the promotion including at least one of a discount, a promotion, a deal or an offer for a free product or service;
     transmit the at least one promotion to the portable electronic device to yield a set of received promotions;
     determine at least one merchant of the first set of merchants that is located within a second geo-fence around the portable electronic device to yield a second set of merchants, the second geo-fence covering a second geographical area within a second distance of the geolocation of the portable electronic device, the second distance being less than the first distance, the second geographical area being a subset of the first geographical area;
     dynamically update, based on a change in the geolocation of the portable electronic device, the first geo-fence and the second geo-fence to yield an updated first set of merchants and an updated second set of merchants;
     sort the updated second set of merchants for presentation on a graphical user interface of the portable electronic device based on at least a relevance criteria of the customer for conducting cardless payment transactions to yield a sorted set of merchants;
     permit the portable electronic device to conduct a cardless payment transaction only with the sorted set of merchants;
     receive, via a tab opened on the portable electronic device, a request to initiate a product purchase process for which the cardless payment transaction is to be processed; and
     process the cardless payment transaction between the customer and an identified merchant from the sorted set of merchants based at least in part on the request and a corresponding promotion from the set of received promotions.

8. The payment processing device of claim 7, wherein the processing the cardless payment transaction comprises:
   based at least in part on the request, sending information to the identified merchant indicating consent of the customer to process the cardless transaction payment with the identified merchant; and
   processing the cardless transaction payment between the customer and the identified merchant based at least in part on the request, the corresponding promotion from the set of received promotions and respective financial information of the customer and the identified merchant available to the payment processing device at the corresponding customer account of the customer and the corresponding merchant account of the identified merchant.

9. The payment processing device of claim 7, wherein the one or more processors are configured to determine the at least one merchant of the first set of merchants by:
   determining that the customer is interested in acquiring a particular item; and
   determining that each merchant of the first set of merchants offers the particular item for acquisition.

10. The payment processing device of claim 7, wherein the sorting is further based on at least one of:
    a visiting frequency with which the customer visits each merchant of the second set of merchants; or
    transaction history of the customer.

11. The payment processing device of claim 7, wherein the one or more processors are configured to execute the computer-readable instructions to:
    upon processing the cardless transaction payment, update the corresponding customer account of the customer and the corresponding merchant account of the identified merchant a to indicate that the corresponding promotion was used in the cardless transaction payment.

12. The payment processing device of claim 11, wherein the one or more processors are configured to execute the computer-readable instructions to:
send updated record of the corresponding customer account of the customer to the portable electronic device associated with the customer.

13. One or more non-transitory computer-readable medium comprising computer-readable instructions, which when executed by one or more processors of a payment processing system, cause the one or more processors to:
determine a geolocation of a portable electronic device associated with a customer, the customer having a corresponding customer account at the payment processing system;
determine at least one merchant located within a first geo-fence around the portable electronic device to yield a first set of merchants, the first geo-fence covering a first geographical area within a first distance of the geolocation of the portable electronic device, each merchant having a corresponding merchant account at the payment processing system, the payment processing system storing transaction data associated with transactions performed between merchants and buyers, wherein one or more merchant computing devices of one or more of the merchants include a respective instance of a merchant application installed thereon for configuring each of the one or more merchant computing devices as a point-of-sale (POS) terminal to communicate over one or more networks with the payment processing system for at least processing cardless payment transactions, the merchants including the first set of merchants;
identify, from among status information for the customer that is stored in a storage unit associated with the payment processing system, at least one promotion for acquisitions with at least one merchant of the first set of merchants, the promotion including at least one of a discount, a promotion, a deal or an offer for a free product or service;
transmit the at least one promotion to the portable electronic device to yield a set of received promotions;
determine at least one merchant of the first set of merchants that is located within a second geo-fence around the portable electronic device to yield a second set of merchants, the second geo- fence covering a second geographical area within a second distance of the geolocation of the portable electronic device, the second distance being less than the first distance, the second geographical area being a subset of the first geographical area;
dynamically updating, based on a change in the geolocation of the portable electronic device, the first geo-fence and the second geo-fence to yield an updated first set of merchants and an updated second set of merchants;
sorting the updated second set of merchants for presentation on a graphical user interface of the portable electronic device based on at least a relevance criteria of the customer for conducting cardless payment transactions to yield a sorted set of merchants;
permit the portable electronic device to conduct a cardless payment transaction only with the sorted set of merchants in the second geo-fence;
receive, via a tab opened on the portable electronic device, a request to initiate a product purchase process for which the cardless payment transaction is to be processed; and
process the cardless payment transaction between the customer and an identified merchant from the sorted set of merchants based at least in part on a corresponding promotion from the set of received promotions.

14. The one or more non-transitory computer-readable medium of claim 13, wherein the execution of the computer-readable instructions by the one or more processors cause the one or more processors to:
determine the geolocation of the portable electronic device.

15. The one or more non-transitory computer-readable medium of claim 13, wherein the execution of the computer-readable instructions by the one or more processors cause the one or more processors to:
based at least in part on the request, send information to the identified merchant indicating consent of the customer to process the cardless transaction payment with the identified merchant; and
process the cardless transaction payment between the customer and the identified merchant based at least in part on the request, the corresponding promotion from the set of received promotions and respective financial information of the customer and the identified merchant available to the payment processing system at the corresponding customer account of the customer and the corresponding merchant account of the identified merchant.

16. The one or more non-transitory computer-readable medium of claim 13, wherein the execution of the computer-readable instructions by the one or more processors cause the one or more processors to:
upon processing the cardless transaction payment, update the corresponding customer account of the customer and the corresponding merchant account of the identified merchant to indicate that the corresponding promotion was used in the cardless transaction payment.

17. The one or more non-transitory computer-readable medium of claim 16, wherein the execution of the computer-readable instructions by the one or more processors cause the one or more processors to:
send updated record of the corresponding customer account of the customer to the portable electronic device associated with the customer.

* * * * *